US012750170B2

(12) United States Patent
Shariatmadari et al.

(10) Patent No.: US 12,750,170 B2
(45) Date of Patent: Sep. 29, 2026

(54) USER EQUIPMENT AND BASE STATION INVOLVED IN RESOURCE INDICATION FOR CONTROL CHANNEL CARRIER SWITCHING

(71) Applicant: Panasonic Intellectual Property Corporation of America, Torrance, CA (US)

(72) Inventors: Hamidreza Shariatmadari, Langen (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 297 days.

(21) Appl. No.: 18/292,259

(22) PCT Filed: Jun. 1, 2022

(86) PCT No.: PCT/EP2022/064886
§ 371 (c)(1),
(2) Date: Jan. 25, 2024

(87) PCT Pub. No.: WO2023/006280
PCT Pub. Date: Feb. 2, 2023

(65) Prior Publication Data

US 2024/0348383 A1 Oct. 17, 2024

(30) Foreign Application Priority Data

Jul. 30, 2021 (EP) .................................... 21188910

(51) Int. Cl.
*H04L 5/00* (2006.01)
*H04W 72/20* (2023.01)

(52) U.S. Cl.
CPC ............ *H04L 5/001* (2013.01); *H04L 5/0048* (2013.01); *H04W 72/20* (2023.01)

(58) Field of Classification Search
None
See application file for complete search history.

(56) References Cited

U.S. PATENT DOCUMENTS

2019/0222361 A1 7/2019 Cheng et al.
2020/0267026 A1* 8/2020 Manolakos ........... H04W 72/23
2024/0187160 A1* 6/2024 El Hamss ............ H04W 72/23

FOREIGN PATENT DOCUMENTS

WO WO 2021078189 A1 4/2021

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).

(Continued)

*Primary Examiner* — Diane L Lo
(74) *Attorney, Agent, or Firm* — Seed Intellectual Property Law Group LLP

(57) ABSTRACT

Techniques disclosed herein feature a user equipment (UE), a base station, a method for a UE and a method for a base station. The UE comprises a transceiver which, in operation, receives an indication of a reference resource and an indication of a component carrier, and circuitry which, in operation, selects, based on the indication of the component carrier, a component carrier for transmitting an uplink control information, UCI; selects, based on a configuration or a UE capability, a resource offset applicable to the selected component carrier, determines a resource for transmitting the UCI by applying the resource offset to the reference resource, and controls transmission of the UCI on (Continued)

the selected component carrier and on the determined resource.

14 Claims, 17 Drawing Sheets

(56) References Cited

OTHER PUBLICATIONS

3GPP, "3rd Generation Partnership Project; Technical Specification Group Radio Access Network; NR; Physical channels and modulation (Release 15)," 3GPP TS 38.211 V15.3.0, Sep. 2018. (96 pages).
3GPP, "3rd Generation Partnership Project; Technical Specification Group Radio Access Network; NR; Physical channels and modulation (Release 15)," 3GPP TS 38.211 V15.6.0, Jun. 2019. (97 pages).
3GPP, "3rd Generation Partnership Project; Technical Specification Group Radio Access Network; Study on Scenarios and Requirements for Next Generation Access Technologies; (Release 16)," 3GPP TR 38.913 v16.0.0, Jul. 2020. (40 pages).
3GPP, "3rd Generation Partnership Project; Technical Specification Group Services and System Aspects; System Architecture for the 5G System; Stage 2 (Release 16)," 3GPP TS 23.501 V16.1.0, Jun. 2019. (368 pages).
Ericsson, "HARQ-ACK Enhancements for IIoT/URLLC," R1-2104217, Agenda Item: 8.3.1.1, 3GPP TSG-RAN WG1 Meeting #105-e, e-Meeting, May 10-27, 2021. (7 pages).
Extended European Search Report, dated Apr. 7, 2022, for European Patent Application No. 21188910.0-1213. (11 pages).
International Search Report, mailed Sep. 27, 2022, for International Application No. PCT/EP2022/064886. (4 pages).
ITU, "IMT Vision—Framework and overall objectives of the future development of IMT for 2020 and beyond," Recommendation ITU-R M.2083-0, Sep. 2015. (21 pages).
LG Electronics, "Considerations on carrier aggregation for NR," R1-1719936, Agenda item: 7.3.4.2, 3GPP TSG RAN WG1 Meeting 91, Reno, USA, Nov. 27-Dec. 1, 2017. (8 pages).
Qualcomm Incorporated, "HARQ-ACK enhancement for IOT and URLLC," R1-2104663, Agenda item: 8.3.1.1, 3GPP TSG RAN WG1 #105-e, e-Meeting, May 10-27, 2021. (21 pages).

* cited by examiner

USER EQUIPMENT AND BASE STATION INVOLVED IN RESOURCE INDICATION FOR CONTROL CHANNEL CARRIER SWITCHING

BACKGROUND

1. Technical Field

The present disclosure relates to transmission and reception of signals in a communication system. In particular, the present disclosure relates to methods and apparatuses for such transmission and reception.

2. Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz. The NR is a follower of the technology represented by Long Term Evolution (LTE) and LTE Advanced (LTE-A).

For systems like LTE, LTE-A, and NR, further modifications and options may facilitate efficient operation of the communication system as well as particular devices pertaining to the system.

BRIEF SUMMARY

One non-limiting and exemplary embodiment facilitates indication of resources and configurations over different component carriers when component carrier switching is enabled.

In an embodiment, the techniques disclosed herein feature a user equipment, UE, comprising a transceiver which, in operation, receives an indication of a reference resource and an indication of a component carrier, and circuitry which, in operation, selects, based on the indication of the component carrier, a component carrier for transmitting an uplink control information, UCI; selects, based on a configuration or a UE capability, a resource offset applicable to the selected component carrier, determines a resource for transmitting the UCI by applying the resource offset to the reference resource, and controls transmission of the UCI on the selected component carrier and on the determined resource.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

DETAILED DESCRIPTION

5G NR System Architecture and Protocol Stacks

3GPP has been working at the next release for the $5^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
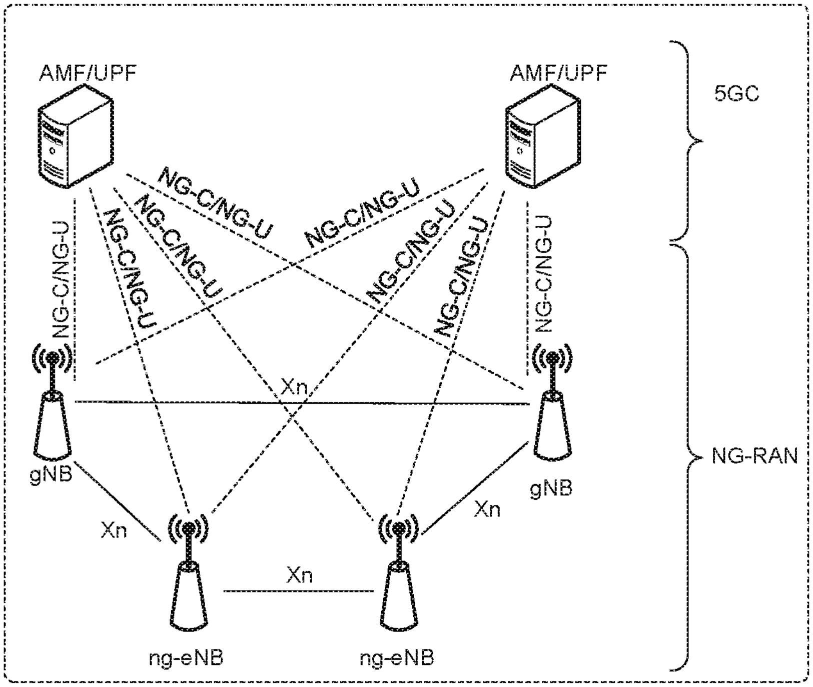
FIG. 1 shows an exemplary architecture for a 3GPP NR system.

Among other things, the overall system architecture assumes an NG-RAN (Next Generation-Radio Access Network) that comprises gNBs (gNodeB), providing the NG-radio access user plane (SDAP/PDCP/RLC/MAC/PHY) and control plane (RRC, Radio Resource Control) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.6.0, section 4).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38,300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), and/or massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1\text{-}10^{-5}$ within 1 ms). Finally, mMTC may preferably require high connection density (1,000,000 devices/$km^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

In NR, a resource block (RB) is defined as 12 consecutive subcarriers in frequency domain. Resource blocks are numbered from zero upwards in frequency domain as Common resource blocks for a subcarrier spacing configuration. Physical resource blocks (PRBs) are defined within a bandwidth part (a subset of contiguous common resource blocks) and numbered per bandwidth part.

5G NR Functional Split Between NG-RAN and 5GC

Figure 2:
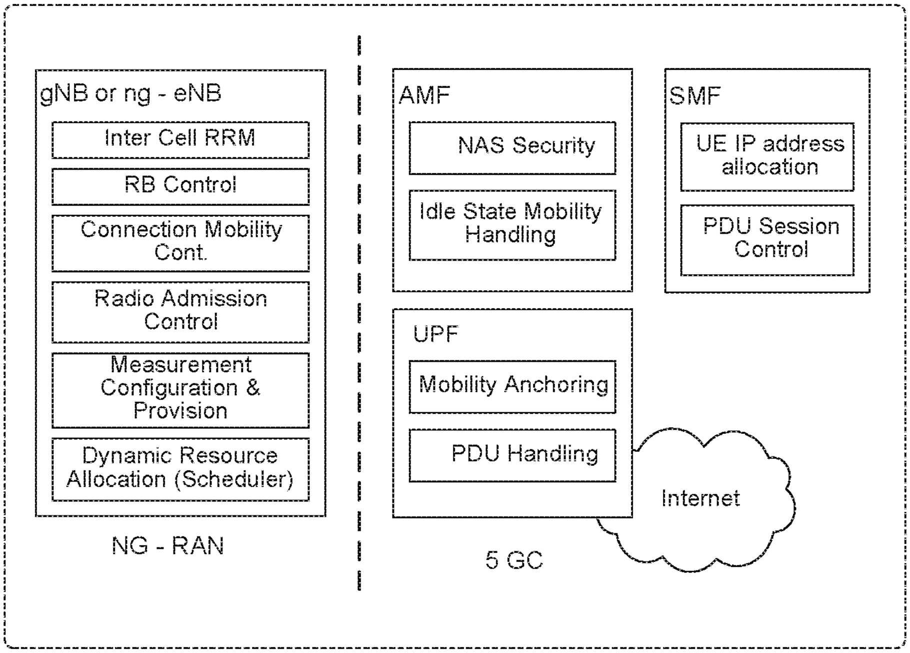
FIG. 2 is a schematic drawing which shows functional split between NG-RAN and 5GC.

FIG. 2 illustrates functional split between NG-RAN and 5GC. NG-RAN logical node is a gNB or ng-eNB (next generation eNB). The 5GC has logical nodes AMF, UPF and SMF.

In particular, the gNB and ng-eNB host the following main functions:

- Functions for Radio Resource Management such as Radio Bearer Control, Radio Admission Control, Connection Mobility Control, Dynamic allocation of resources to UEs in both uplink and downlink (scheduling);
- IP header compression, encryption and integrity protection of data;
- Selection of an AMF at UE attachment when no routing to an AMF can be determined from the information provided by the UE;
- Routing of User Plane data towards UPF(s);
- Routing of Control Plane information towards AMF;
- Connection setup and release;
- Scheduling and transmission of paging messages;
- Scheduling and transmission of system broadcast information (originated from the AMF or OAM);
- Measurement and measurement reporting configuration for mobility and scheduling;
- Transport level packet marking in the uplink;
- Session Management;
- Support of Network Slicing;
- QoS Flow management and mapping to data radio bearers;
- Support of UEs in RRC_INACTIVE state;
- Distribution function for NAS (Non-access stratum) messages;
- Radio access network sharing;
- Dual Connectivity;
- Tight interworking between NR and E-UTRA.

The Access and Mobility Management Function (AMF) hosts the following main functions:

- Non-Access Stratum, NAS, signaling termination;
- NAS signaling security;
- Access Stratum, AS, Security control;
- Inter Core Network, CN, node signaling for mobility between 3GPP access networks;
- Idle mode UE Reachability (including control and execution of paging retransmission);
- Registration Area management;
- Support of intra-system and inter-system mobility;
- Access Authentication;
- Access Authorization including check of roaming rights;

Mobility management control (subscription and policies);
Support of Network Slicing;
Session Management Function, SMF, selection.

Furthermore, the User Plane Function, UPF, hosts the following main functions:

Anchor point for Intra-/Inter-RAT mobility (when applicable);
External PDU session point of interconnect to Data Network;
Packet routing & forwarding;
Packet inspection and User plane part of Policy rule enforcement;
Traffic usage reporting;
Uplink classifier to support routing traffic flows to a data network;
Branching point to support multi-homed PDU session;
QoS handling for user plane, e.g., packet filtering, gating, UL/DL rate enforcement;
Uplink Traffic verification (SDF to QoS flow mapping);
Downlink packet buffering and downlink data notification triggering.

Finally, the Session Management function, SMF, hosts the following main functions:

Session Management;
UE IP address allocation and management;
Selection and control of UP function;
Configures traffic steering at User Plane Function, UPF, to route traffic to proper destination;
Control part of policy enforcement and QoS;
Downlink Data Notification.

RRC Connection Setup and Reconfiguration Procedures

Figure 3:
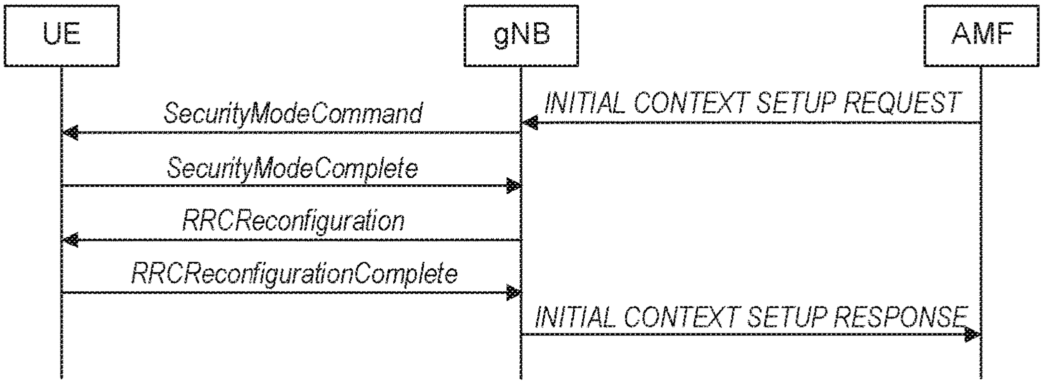
FIG. 3 is a sequence diagram for RRC connection setup/reconfiguration procedures.

FIG. 3 illustrates some interactions between a UE, gNB, and AMF (a 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signalling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 4:
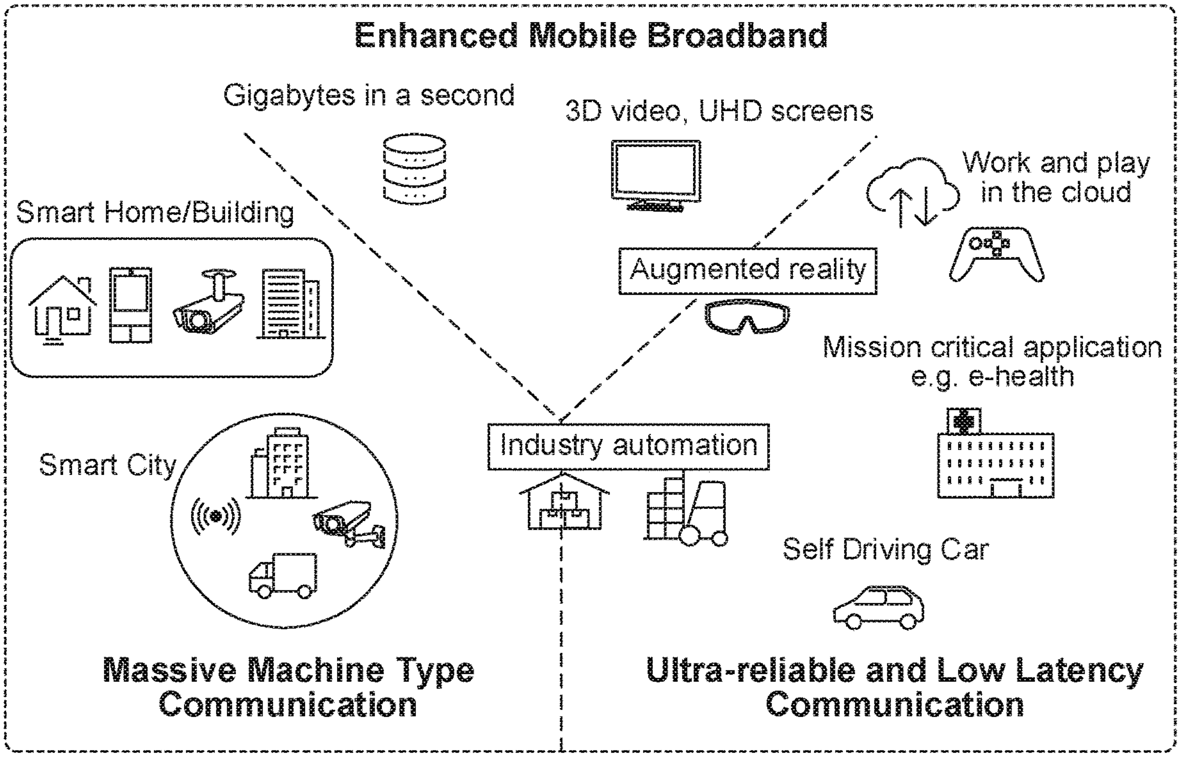
FIG. 4 is a schematic drawing showing usage scenarios of Enhanced mobile broadband (eMBB), Massive Machine Type Communications (mMTC) and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see, e.g., FIG. 2 of ITU-R M.2083).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI (Downlink Control Information) formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider, One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^{-6}$ level), higher availability, packet sizes of up to 256 bytes, time synchronization down to the order of a few µs where the value can be one or a few µs depending on frequency range and short latency in the order of 0.5 to 1 ms in particular a target user plane latency of 0.5 ins, depending on the use cases.

Moreover, for NR URLLC, several technology enhancements from the physical layer perspective have been identified, Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term “mini-slot” refers to a Transmission Time Interval (TTI) including a smaller number of symbols than a slot (a slot comprising, e.g., fourteen symbols).

In slot-based scheduling or assignment, a slot corresponds to the timing granularity (TTI-transmission time interval) for scheduling assignment. In general, TTI determines the timing granularity for scheduling assignment. One TTI is the time interval in which given signals is mapped to the physical layer. For instance, conventionally, the TTI length can vary from 14-symbols (slot-based scheduling) to 2-symbols (non-slot based scheduling). Downlink (DL) and uplink (UL) transmissions are specified to be organized into frames (10 ms duration) consisting of 10 subframes (1 ms duration). In slot-based transmission, a subframe is further divided into slots, the number of slots being defined by the numerology/subcarrier spacing. The specified values range between 10 slots per frame (1 slot per subframe) for a subcarrier spacing of 15 kHz to 80 slots per frame (8 slots per subframe) for a subcarrier spacing of 120 kHz. The number of OFDM symbols per slot is 14 for normal cyclic prefix and 12 for extended cyclic prefix (see section 4.1 (general frame structure), 4.2 (Numerologies), 4.3.1 (frames and subframes) and 4.3.2 (slots) of the 3GPP TS 38.211 V15.3.0, Physical channels and modulation, 2018-09). However, assignment of time resources for transmission may also be non-slot based. In particular, the TTIs in non slot-based assignment may correspond to mini-slots rather than slots. I.e., one or more mini-slots may be assigned to a requested transmission of data/control signaling. In non slot-based assignment, the minimum length of a TTI may for instance be 1 or 2 OFDM symbols.

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
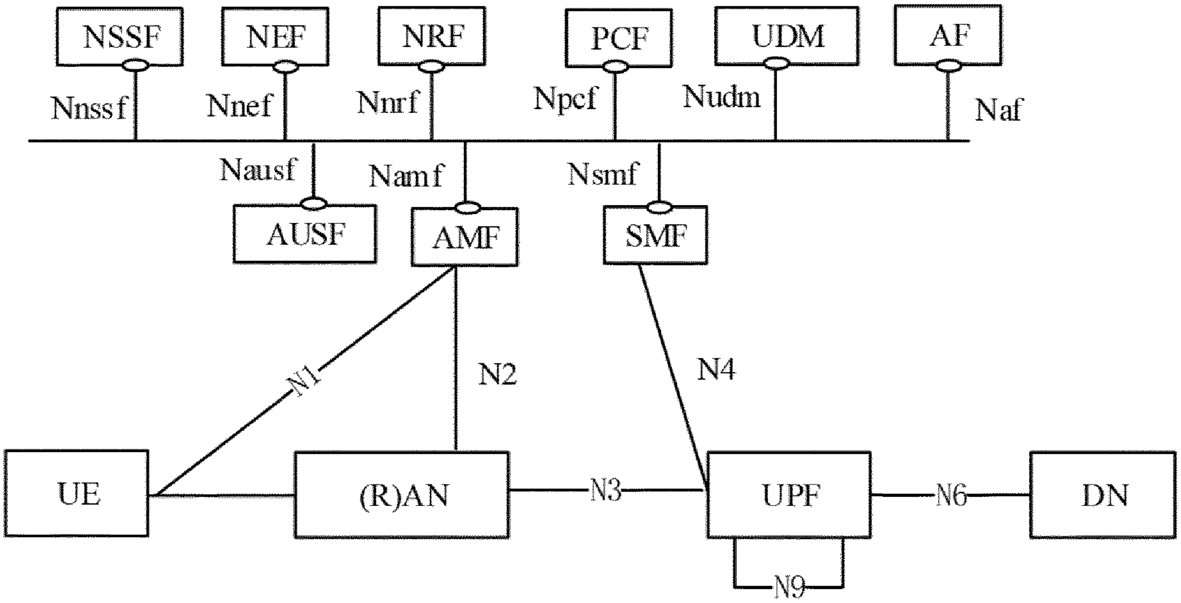
FIG. 5 is a block diagram showing an exemplary 5G system architecture for a non-roaming scenario.

FIG. 5 illustrates a 5G NR non-roaming reference architecture (see TS 23.501 v16.1.0, section 4.23). An Application Function (AF), e.g., an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QoS requirement for at least one of URLLC, eMMB and mMTC services to at least one of functions (for example NEF, AMF, SMF, PCF, UPF, etc.) of the 5GC to establish a PDU session including a radio bearer between a gNodeB and a UE in accordance with the QoS requirement and control circuitry, which, in operation, performs the services using the established PDU session.

Carrier Switching

3GPP has been working on enhancements for industrial Internet of things of things (IIoT) and ultra-reliable low-latency (URLLC) in 3GGP Rel. 17. IIoT is directed to extending Internet connectivity in industrial sectors, such as manufacturing and energy distributions, which require Internet connectivity with URLLC features. The work includes modifications regarding the UE feedback, such as HARQ-ACK and CQI transmissions, Therein, work is concerned an issue that in time division duplex (TDD) systems, the physical uplink control channel (PUCCH), carrying uplink control information (UCI), transmissions might be delayed/deferred often due to the unavailability of uplink (UL) slots, especially, with heavy downlink (DL) slot configuration.

This problem can be alleviated by exploiting the PUCCH carrier switching, in which different carriers can be utilized for PUCCH transmissions.

In particular, the PUCCH carrier switching can be utilized for transmitting HARQ-ACK associated to DL data transmissions, including dynamic scheduling and semi-persistent scheduling (SPS). Approaches in carrier switching include dynamic carrier switching and semi-static carrier switching.

Dynamic carrier switching can be achieved by indicating the carrier target for PUCCH transmission in a Downlink Control Information (DCI). The carrier indication can be defined as a dedicated field in a DCI or as a part of PUCCH resource indicator (PRI). This approach may provide a high flexibility, since the PUCCH carrier for each DL transmission can be dynamically changed. However, this approach is mainly limited to scheduled DL transmissions, and not directly applicable to SPS DL transmissions.

Semi-static carrier switching can be achieved by defining a timing pattern for the UE to select the target carrier for PUCCH transmission. This benefit of this approach is that it does not increase the DCI signaling overhead. Also, it can be used for both scheduled and SPS DL transmission schemes. However, it is a limitation of semi-static carrier switching that the timing pattern might need to be updated after enabling/disabling the carriers or modifying the slot configurations over carriers.

It has been agreed in RAN1 #105-e meeting for PUCCH carrier switching that PUCCH carrier switching based on dynamic indication in DCI scheduling a PUCCH and semi-static configuration should be supported. An aim therein is to have minimum specification impact. Further, dynamic indication and/or semi-static configuration should be subject to separate UE capabilities. The semi-static configuration should be based on RRC (Radio Resource Control) configured PUCCH cell timing pattern of applicable PUCCH cells and support PUCCH carrier switching across cells with different numerologies (in this context "cells" correspond to carriers or component carriers). It was left for further specification whether additional rules are needed to support PUCCH carrier switching across cells with different numerologies. Also left for further specification were details including applicability of dynamic and/or semi-static means, a maximum number of PUCCH cells, whether and how to support joint operation of dynamic and semi-static carrier switching for a U E as well as whether and how to support joint operation of PUCCH carrier switching and SPS HARQ-ACK deferral.

It has been further agreed that for PUCCH carrier switching, the PUCCH resource configuration should be per UL BWP (bandwidth part), i.e., per candidate cell and UL BWP of that specific candidate cell.

Moreover, it has been agreed that for PUCCH carrier switching based on dynamic indication of DCI in DCI scheduling a PUCCH the PDSCH to HARQ-ACK offset k1 should be interpreted based on the numerology of the dynamically indicated target PUCCH cell.

Figure 6:
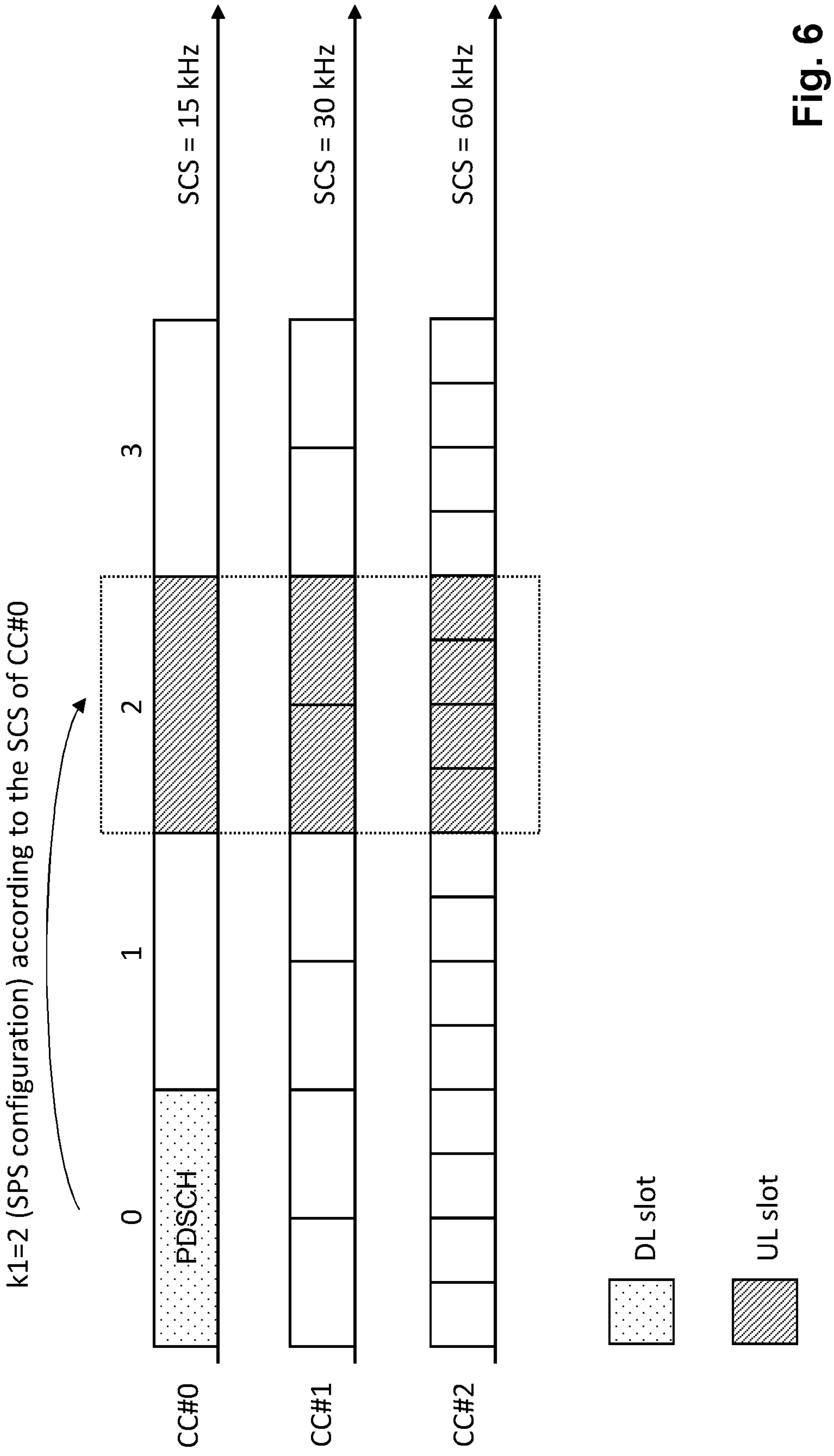
FIG. 6 illustrates a possible ambiguity in indication of a timing offset for PUCCH resources on carriers with different numerologies.

Issues regarding support for PUCCH carrier switching include indication of the PUCCH resources/configurations over different carriers, e.g., carriers with different numerologies. In particular, for SPS, a UE is configured with a timing offset (k1) that indicates, e.g., the number of slot(s) between the DL data reception and the HARQ-ACK transmission. The offset is defined according to the numerology of the PDSCH carrier, e.g., PCell (Primary Cell). Using the defined timing offset for PUCCH transmission over a carrier with different numerology may cause an ambiguity for resource usage. This is illustrated in FIG. 6, which shows an example where SPS traffic is carried over the CC #0 with k1=2. In case the UE is configured (e.g., through the timing pattern) to transmit HARQ-ACK report over one of component carriers CC #1 or CC #2, there would be several possible occasions for HARQ-ACK transmission. Using the earliest available slot is not always desired especially when there are many active users using the cell.

Another issue is related to consideration of the minimum processing time for carriers with different numerologies. The minimum processing time or PDSCH processing time is a minimum time interval starting from the PDSCH reception, e.g., number of symbols, after which the UE can report a HARQ-ACK corresponding to the PDSCH or in response to the PDSCH. For instance, the UE processing time depends on the UE capability and on the employed subcarrier spacing (SCS) and the corresponding symbol duration.

Figure 7:
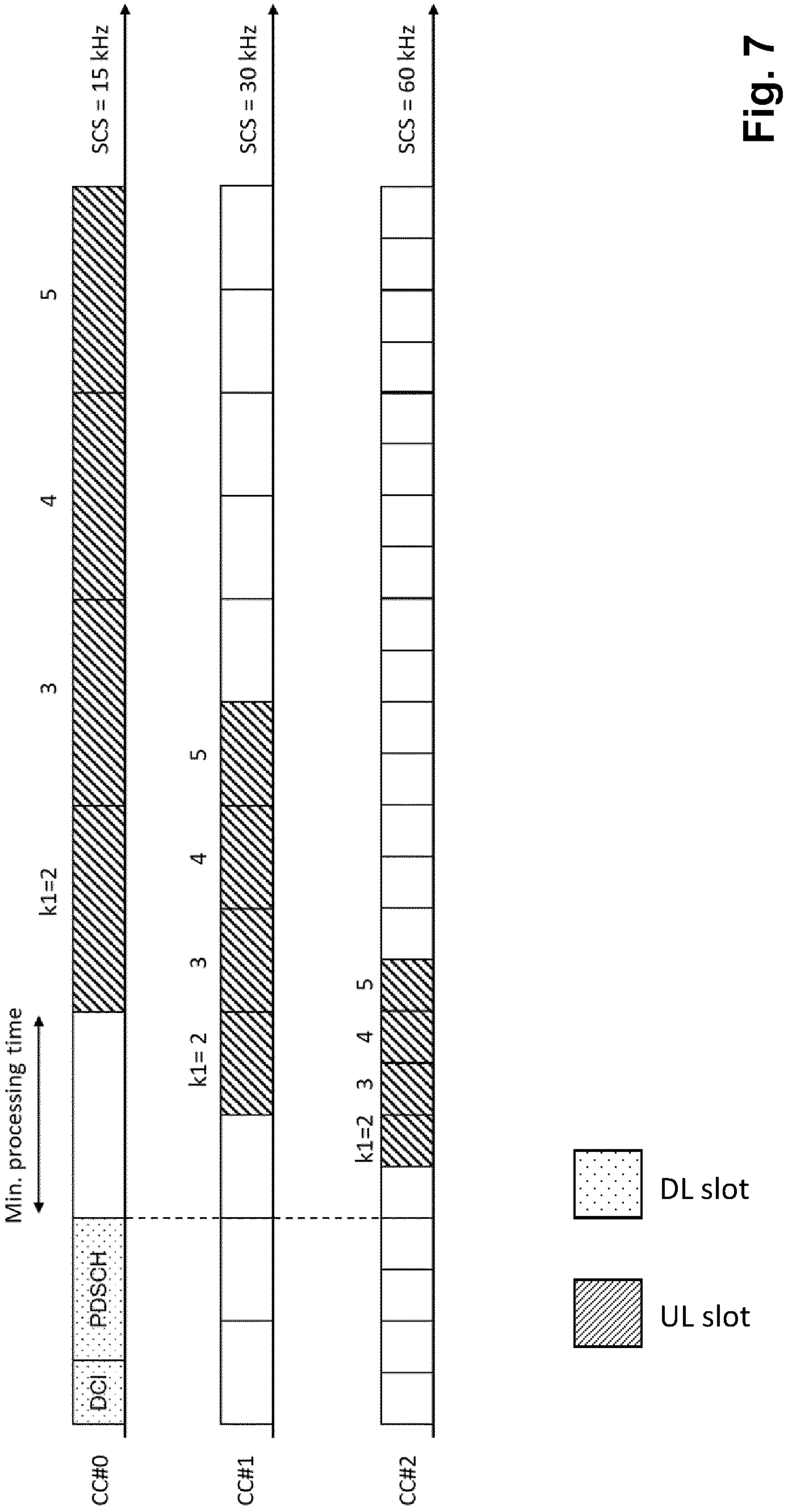
FIG. 7 illustrates a requirement of a minimum processing time for preparing the PUCCH transmission using resources on carriers with different numerologies.

In particular, for dynamic scheduling, a UE receives a PDSCH-to-HARQ_feedback timing indicator, that is mapped to a set of k1 values, as a part of downlink control information (DCI). For a single PUCCH carrier, the set of k1 values can be configured properly considering the processing time. However, using a unified set of k1 values for all PUCCH carriers with different numerologies may result in a large time variation, in which only a few of the values may be usable for each carrier (other values might violate the minimum processing time). This may limit the timing flexibility for reporting HARQ-ACK reports. An example is illustrated in FIG. 7, which shows scheduled downlink transmissions with a defined set k1 of k1={2,3,4,5}. Assuming that the minimum processing time is 1 slot according to the SCS=15 kHz, some of k1 values cannot be used for other carriers (e.g., k1=2 on component carrier CC #1 with SCS=30 kHz or k1={2,3,4} on component carrier CC #3 with SCS=60 kHz).

Further issues lie in the support of PUCCH carrier switching when both dynamic and semi-static are enabled.

In view of these issues, the present disclosure provides techniques for resource indication for control channel carrier switching.

More particularly, in accordance with embodiments of this disclosure, the UE is configured with reference PUCCH configurations, e.g., including start symbol in a slot, number of symbols, start PRB (physical resource block), subcarriers, and/or cyclic shift indexes. Other PUCCH configurations are defined for the UE with respect to the reference PUCCH configurations using offset sets, such as a set of timing offset values, a set of start symbol offset values, a set of number of symbol offset values, a set of PRB offset values, a set of subcarrier offset values, and/or a set of cyclic shift index offset values. The UE applies the specified offset values to the reference PUCCH configurations to adapt it for transmission over the target carrier.

For instance, the offset sets can be specified uniquely for each carrier (PUCCH configurations may be different among the carriers), all carriers configured for dynamic carrier switching (PUCCH configurations would be the same for all carriers configured for dynamic carrier switching), all carriers configured for semi-static carrier switching (PUCCH configurations would be the same for all carriers configured for semi-static carrier switching), or all carriers with the same numerology (PUCCH configurations would be the same for all carriers with the same numerologies).

The offset sets may further be defined uniquely for the whole carrier (PUCCH configurations would be the same over all the slots), each mini-slot/slot/frames within a carrier (PUCCH configurations could be different for each mini-slot/slots/frame), a number of consecutive mini-slots/slots/ frames within a carrier (PUCCH configurations would be the same for several consecutive mini-slot/slots/frame).

Moreover, in accordance with embodiments of the present disclosure where both dynamic carrier switching and semi-static carrier switching are enabled, the UE may initially try to apply the dynamic carrier switching. If the PUCCH resource is not available over the dynamic indicated carrier, then the UE follows the semi-static carrier switching for PUCCH transmissions.

A terminal is referred to in the LTE and NR as a user equipment (UE). This may be a mobile device or communication apparatus such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station is a network node or scheduling node, e.g., forming a part of the network for providing services to terminals. A base station is a network node, which provides wireless access to terminals. E.g., a base station is referred to in NR as gNB.

Figure 8:
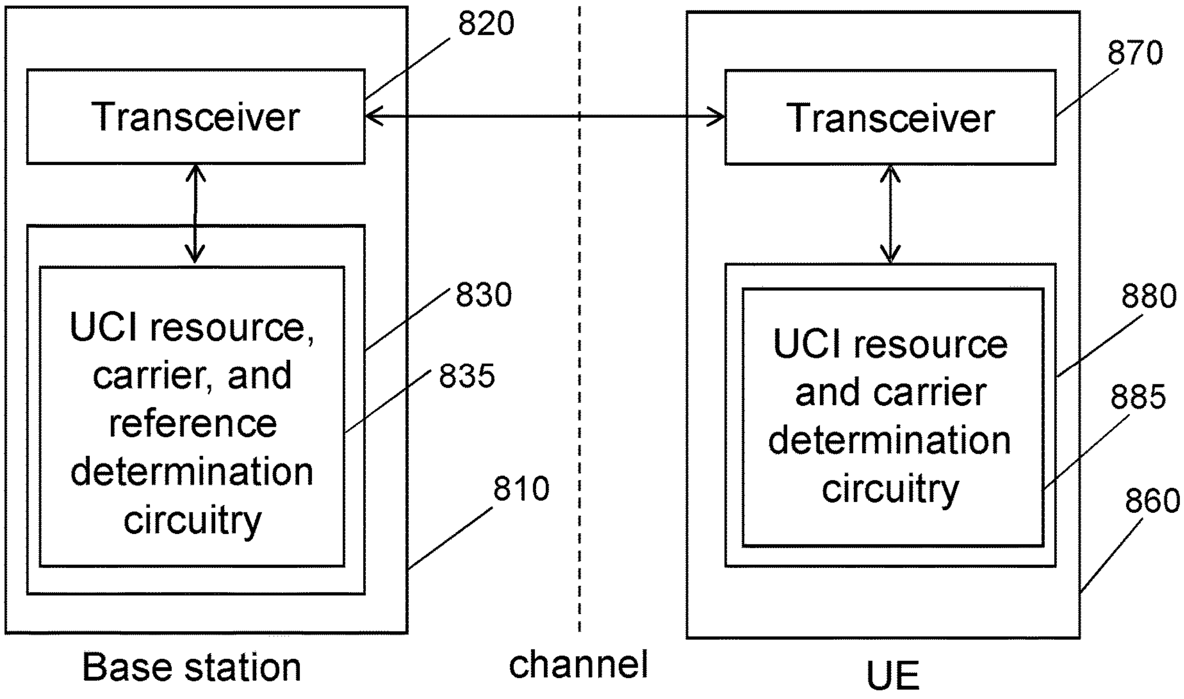
FIG. 8 is a block diagram of a user equipment and a base station.
Figure 9:
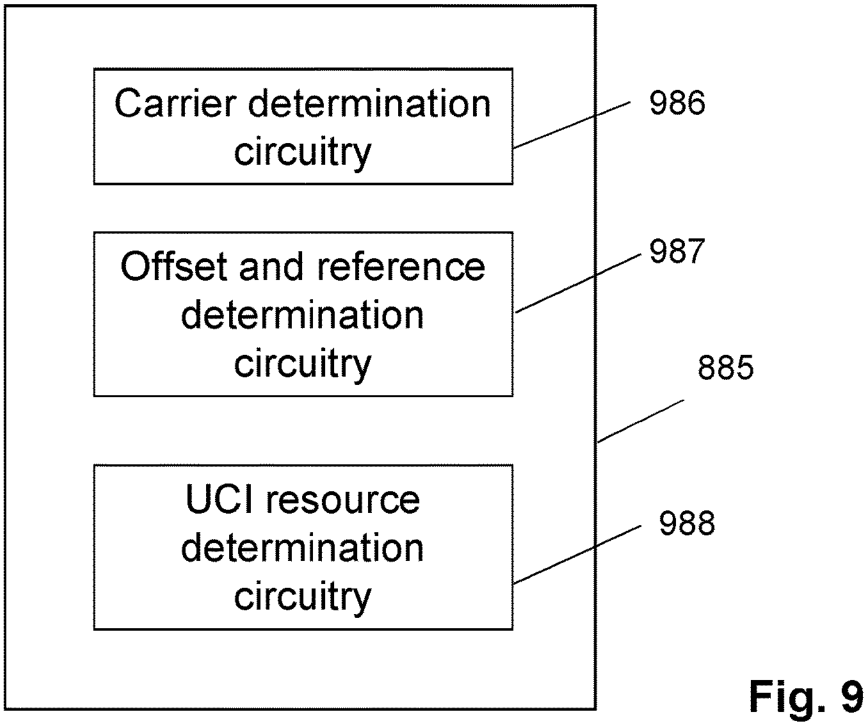
FIG. 9 is a block diagram showing UCI resource and carrier determination circuitry.

As shown in FIG. 8, provided is a user equipment 860 (UE) including circuitry 880 ("UE circuitry" including control circuitry and/or processing circuitry) and a transceiver 870 (or "UE transceiver). The transceiver 870, in operation, receives an indication of a reference resource and an indication of a component carrier. The circuitry 880, in operation, selects, based on the indication of the component carrier, a component carrier for transmitting an uplink control information (UCI). The circuitry, in operation, further selects a resource offset applicable to the selected component carrier. As will be described further, the selection is be based on a configuration or a UE capability. By applying the resource offset to the reference resource, the U E circuitry 880 determines a resource for transmitting the UCI, and controls transmission of the UCI on the selected component carrier and on the determined resource.

The controlling of transmission includes controlling the UE transceiver 870, which transmits the UCI bit is not limited thereto and also includes coding and mapping as the resources may include time and frequency resources, but may also include other resources such as code resources which are not tangible on the level of the transceiver.

Further provided, as also shown in FIG. 8, is a base station 810 including circuitry 830 (or "base station circuitry", "BS circuitry") and a transceiver 820 (or "base station transceiver", "BS transceiver"). The base station circuitry 830, in operation, determines a resource for receiving an uplink control information, UCI, on a component carrier, and determines a reference resource. Therein, the reference resource is determinable by applying a configured resource offset applicable to the component carrier to the reference resource. The base station transceiver 820, in operation, transmits an indication of the reference resource and an indication of the component carrier. The base station circuitry controls reception of the UCI on the resource for receiving the UCI on the component carrier.

The controlling includes controlling the base station transceiver, which receives the UCI, but is not limited thereto.

For instance, the UE circuitry 880 includes UCI resource and carrier determination circuitry 885, and the BS circuitry 830 includes UCI resource, carrier, and reference determination circuitry 835. Exemplary UCI resource and carrier determination circuitry 885 of a UE is shown in FIG. 8, including carrier determination circuitry 986, offset and reference determination circuitry 987, and UCI resource determination circuitry 988.

Figure 10:
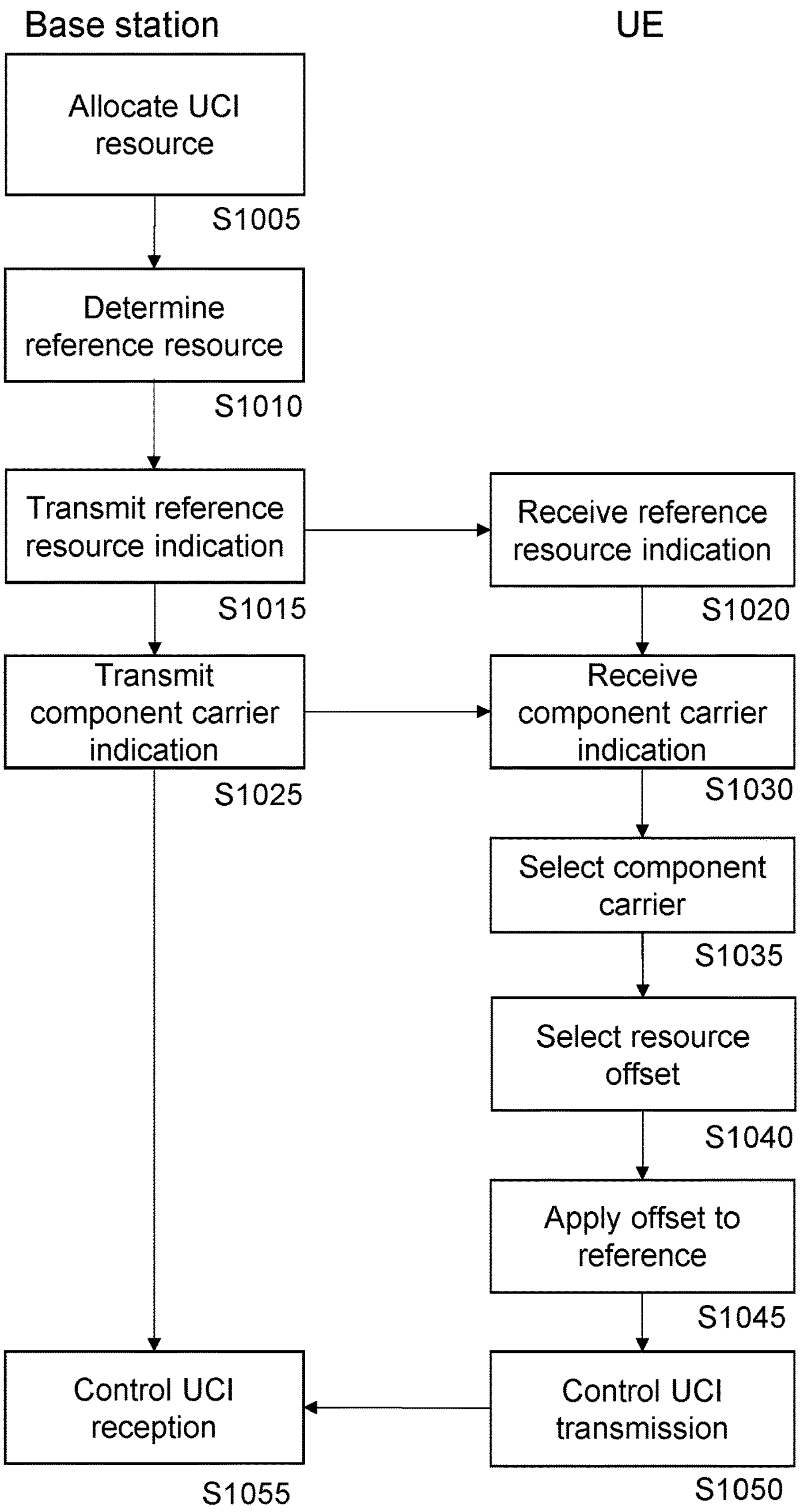
FIG. 10 is a flow chart showing a method for a UE and a method for a base station.

Further provided, and shown in FIG. 10, are a method (e.g., a communication method) for a UE and a method (e.g., a communication method) for a base station.

The base station method includes a step S1005 of allocating a resource for receiving an uplink control information, UCI, on a component carrier. The base station method further includes step S1010 of determining a reference resource such that the resource for transmitting the UCI is determinable by applying a configured resource offset applicable to the component carrier to the reference resource. The base station method further includes steps S1015 of transmitting an indication of the reference resource and a step S1025 of transmitting an indication of the component carrier on which the UCI is to be received. E.g., in steps S1015 and S1025, the indications are transmitted to the UE. Finally, the BS station method includes step S1055 of controlling reception of the UCI on the resource for receiving the UCI on the component carrier.

Accordingly, the UE method includes step S1020 of receiving an indication of the reference resource and step S1030 of receiving an indication of the component carrier. Then, in step S1035 of the UE method, a resource offset applicable to the selected component carrier is selected based on configuration or a UE capability, and by applying the resource offset to the reference resource, a resource for transmitting the UCI is determined in step S1045, and transmission of the UCI on the selected component carrier and on the determined resource is performed in step S1050 (to be received by the base station in accordance with above-described step S1055).

In the present disclosure, any embodiments, examples, and details that are mentioned in the description of apparatus features imply a corresponding method step, and vice versa. Furthermore, since the UE 860 and the base station 810 constitute interrelated products, any UE feature and UE method step is to be understood as implying a corresponding base station feature and BS method step, unless the context indicates otherwise.

The above-described indication of a reference source and the indication of the component carrier may be transmitted and received within a single message, e.g., dynamically indicated via DCI (downlink control information) or semi-statically signaled via Radio Resource Control (RRC signaling). E.g., there may be fields in the DCI for the reference resource and the component carrier, or they may be both part of the above-mentioned PRI Alternatively, the reference resource and the component carrier may be indicated via different signals or types of signal. For instance, the component carrier may be indicated via semi-static carrier switching, whereas the reference resource is indicated via DCI.

As described above, the component carrier for transmitting the UCI is selected based on the received indication of the component carrier. For instance, the UE may select the component carrier indicated by the indication. Alternatively, in some embodiments to be described further, the UE may decide, based on a value indicated in the indication, whether to select an indicated component carrier or to select another component carrier indicated elsewhere, e.g., a configured component carrier.

Furthermore, as described above, the resource offset may be selected based on a configuration, such as a semi-static configuration of a PUCCH. E.g., for each selectable or switchable component carrier (also referred to as "carrier"

for short), the UE is configured with a corresponding resource offset, e.g., via semi-static configuration. E.g., the BS circuitry 830 configures a respective resource offset for each carrier, the BS transceiver 820 transmits the configuration via RRC signaling, and the UE transceiver 870 receives the RRC signaling or semi-static signaling including the configuration. The resource offset is an offset with respect to the reference resource. By applying the resource offset to the reference resource, the resource for transmitting the UCI is obtained.

Alternatively, as also described, the resource offset may be determined based on a capability of UE 860, or more specifically, may be determined to satisfy a UE's minimum processing time between the reception of a downlink message and a time the UCI transmitted in response to the downlink message.

For instance, the uplink control information (UCI) may include a feedback or response to a downlink message (e.g., a data transmission in a PDSCH), such as a HARQ (hybrid automatic repeat request) ACK or NACK (acknowledgement/negative acknowledgement). Accordingly, the BS transceiver 820 may further transmit, and the UE transceiver 870 receive, a downlink message via PDSCH, However, the present disclosure is not limited to the kind of UCI, and other examples of UCI may include SR (Scheduling Request) or CQI (Channel Quality Indicator) transmissions.

Furthermore, the resource for transmitting/receiving the UCI may include any resources for mapping data including resources in time domain, frequency domain, code domain, or diversity (e.g., spatial, antenna pattern, or polarization) such as MIMO (multiple input, multiple output) and/or beamforming, either alone or in combination. For instance, the resource for transmitting the UCI includes one or more of a starting slot, a number of slots, a starting symbol, a number of symbols (as examples of time domain resources), a physical resource block (as an exemplary frequency resource), or a cyclic shift index (as an exemplary code domain resource).

The component carrier for transmitting the UCI (or the "target component carrier" or a second component carrier) may be a component carrier out of a plurality of component carriers including a first component carrier, which may be considered a reference component carrier (e.g., a component carrier with a narrowest SCS, a component carrier numbered zero, a primary carrier, or a component carrier where a DCI/PDCCH and/or PDSCH has been received). The UE (e.g., the UE circuitry 880) may switch to the second component carrier for transmitting the UCI, or remain on the first component carrier in case the second component carrier is indicated and/or determined to be the same component carrier as the first component carrier.

Timing Indication According to Reference Carrier

Some embodiments include determining a timing (e.g., slot for PUCCH/UCI transmission) over a target carrier (the carrier where the UCI is to be transmitted) when a timing indication of a reference timing is provided according to the PDSCH carrier. A time offset is provided, which is applicable, e.g., to semi-static carrier switching.

For instance, the component carrier for transmitting the UCI is configured semi-statically, in accordance with the above-description of semi-static switching, e.g., the indication of the component carrier is transmitted/received via semi static signaling, such as, RRC signaling. The reference resource includes a timing reference, and the resource offset includes a timing offset. In the determination of the resource for transmitting the UCI, the UE circuitry 880 (and correspondingly the BS circuitry 830 when determining the offset to be signaled to the UE), interprets the timing reference according to a reference numerology, and interprets the timing offset according to a numerology of the selected component carrier, which is the target carrier where the UCI is to be transmitted (and to which the UE circuitry 880 switches in case the target carrier is different from the reference carrier), The reference numerology may, for instance, be a numerology of a component carrier on which a PDSCH is received, e.g., when the UCI is in response to the PDSCH.

By applying the timing offset to the timing reference, a resource in the timing domain (or time resource) is determined as a resource for transmitting the UCI. The timing resource for transmitting the UCI may refer to a slot or other time unit, such as, symbol, mini-slot, or some combination of the aforementioned, where the UCI is to be transmitted. The timing offset value and the reference timing value can be represented by a number of symbols, mini-slots, and/or slots. The "reference numerology" may be the numerology of a defined carrier, such as, the carrier on which a PUCCH has been transmitted/received, or a configured carrier (e.g., semi-statically configured), such as, carrier #0 or a carrier with the narrowest SCS corresponding to the longest symbol duration.

Figure 11:
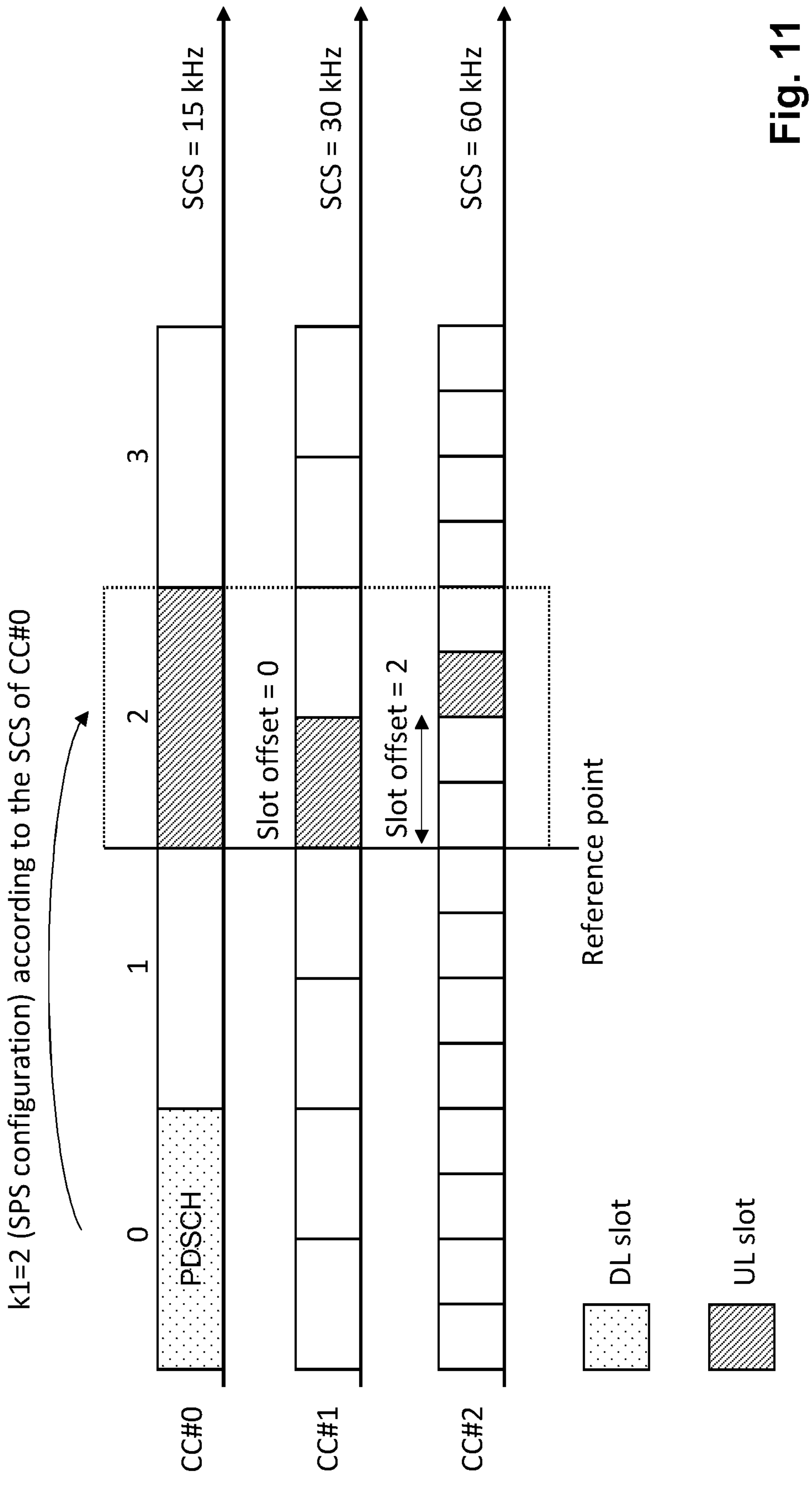
FIG. 11 illustrates a slot offset with respect to a time reference according to a reference carrier.

An example is shown in FIG. 11. Therein, semi-persistent scheduling is configured with k1=2 (slot number 2) according to the PDSCH carrier (the carrier on which the PDSCH has been received). Accordingly, the UE is configured to transmit the UCI in slot number 2, wherein the slot number corresponds to the numerology of the PDSCH carrier. Accordingly, the reference timing is determined by measuring the slot length according to a slot duration according the reference numerology. The UE is configured with timing offsets, indicating a number of slots, for all carriers configured for switching. As shown in FIG. 11, a 0-slot offset is configured for CC #0, a 0-slot offset is configured for CC #1, and a 2-slot offset is configured for CC #2. The slot offsets correspond to the numerologies of the respective component carriers and are measured in the slot durations corresponding to the subcarrier spacings of the respective numerologies. In the example shown, the timing offset values are provided for all the carriers separately (the offsets may also be configured per some carrier group, as will be described further).

The UE first identifies the slot for PUCCH transmission according to the PDSCH carrier numerology, as the timing reference or time reference point. Then, the UE determines the PUCCH carrier, e.g., based on a defined timing pattern. When the carrier is identified, the UE applies the specified timing offset value, associated to the target carrier, to the time reference point (beginning of the slot indicated by k1 according to the PDSCH carrier) to determine the slot for PUCCH transmission.

By providing a timing offset as described above, the present disclosure facilitates unambiguous indication of PUCCH resource in view of the above-described issue illustrated in FIG. 6.

Timing Indication According to Target Carrier

Some embodiments provide for determining a timing (e.g., slot) for the UCI transmission (or the PUCCH transmission) over the target carrier when the timing indication of the reference timing is provided or interpreted according to the target carrier. E.g., a same timing indication value or a same set of timing indication values is used among different carriers. A timing offset is determined, which is applicable, e.g., to dynamic carrier switching.

For instance, the indication of the component carrier is received dynamically via DCI (e.g., as a dedicated field in a DCI or as a part of PUCCH resource indicator (PRI)). The reference resource includes a timing reference (e.g., one or more symbols, mini-slots, or slots), and the resource offset includes a timing offset (e.g., a symbol offset, or slot offset, or mini-slot offset). By applying the resource offset to the reference resource, a time resource for transmitting the UCI is determined. The timing reference and the timing offset are indicated and interpreted by the UE circuitry in a time unit (e.g., symbol duration, slot duration) applicable to a numerology of the component carrier or target carrier selected for the UCI transmission.

Figure 12:
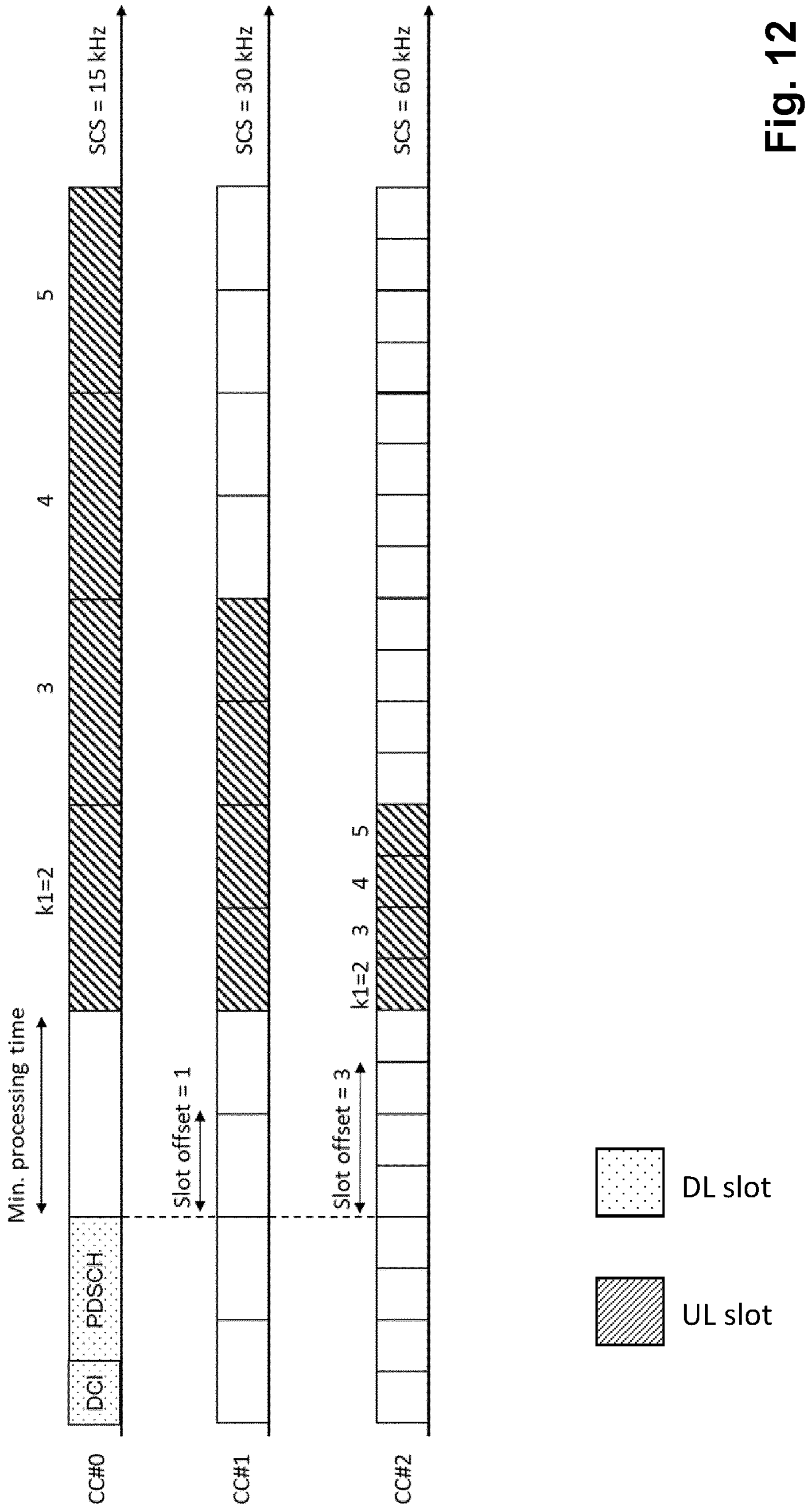
FIG. 12 illustrates a slot offset with respect to time reference corresponding to a target carrier.

In an example shown in FIG. 12, a UE is configured with a set k1 of slots {2, 3, 4, 5} constituting the "reference resource". The UE may receive the value of k1 via DCI. The UE is further configured with timing offset values for all carriers available for transmitting the UCI. In the example of FIG. 12, the UE is configured with a 0-slot offset for CC #0, a 1-slot offset for CC #1, and a 3-slot offset for CC #2.

When the UE identifies the component carrier index and the reference timing value of k1 from the DCI, it applies the specified (e.g., configured) timing offset value in the determination of the resource for transmitting the UCI. The slot offset is applied to each value out of the set k1. E.g., by applying the slot offset, the UE determines the set {3,4,5,6} as the resource for UCI transmission on CC #1, or {5,6,7,8} on CC #3. E.g., the total number of slots (slot offset plus slot indicated by k1) is counted starting from the end of the slot where the PDSCH is received (e.g., a PDSCH to which the UCI is a response) or some other suitable starting point such as a beginning of a subframe. Rather than applying the offset to the k1 values, the offset can be considered to be applied to the starting point, and the k1 values are counted from the time point resulting from applying the offset, with the same result.

As described above, the UE can be configured with offset values semi-statically (e.g., through RRC). Alternatively, the offset value may be based on a UE capability, as mentioned above, and be determined by the UE without being signaled. E.g., the UE can adjust the offset values for the respective component carriers to satisfy its minimum processing time. The timing reference may be indicated in a time unit applicable to a numerology of the selected component carrier, and the timing offset is calculated such that the resource for transmitting the UCI starts at least a minimum processing time after the end of reception of the downlink message.

As mentioned, the minimum processing time (e.g., a time interval starting from the end of a downlink message after which a UE can provide HARQ feedback to the DL message) is based on or corresponds to a UE capability. In particular, a number of time units (e.g., symbols and/or slots) constituting the minimum processing time depends on the UE capability as well as the symbol/slot duration corresponding to the numerology of the component carrier for the UCI transmission.

Since a UE reports the minimum processing time to the base station, e.g., in response to a UE Capability Enquiry message signaled via RRC, the minimum processing time is also known to the base station, which therefore knows the timing for receiving the UCI.

The timing offset is determined such that the sum of timing reference and timing offset is equal or greater than the minimum processing time. For instance, the timing offset is determined to be equal to or larger than a difference between a number of slots (or other time units such as symbols or mini-slots) constituting the minimum processing time in the numerology of the target carrier and a first slot number (or mini-slot number or symbol number) of the reference resource k1. As an example, the time for transmitting the UCI may be a minimum of a slot indicated by the reference timing (e.g., a slot number k1 or a lowest slot number in the set k1) and a number of slots constituting the minimum processing time in the respective numerology.

In accordance with the above-described embodiments where the timing indication is interpreted according to the target carrier, the usage of the timing offsets enables aligning a signaled value of a reference resource (e.g., an indication k1 of slots) among different carriers and may facilitate improving the scheduling flexibility. Moreover, the disclosed embodiments may facilitate satisfying the minimum processing time, both when the offset is signaled and when the offset is determined by the UE based on its minimum processing time (or a symbol or mini-slot number may be used).

Types of Offset Values

PUCCH configurations can be different over different carriers, and therefore, in an exemplary wireless communication system, PUCCH configurations may be defined separately for each carrier. On the other hand, in accordance with the present disclosure, PUCCH configurations over one carrier (e.g., a "reference carrier" such as component carrier #0 or a primary cell/primary carrier) may be considered as reference configurations (e.g., defining reference resources), whereas configurations for other carriers may be defined using offset (or "resource offsets") values with respect to the reference PUCCH configurations.

For instance, the UE interprets a configuration indicating resources for a first component carrier (a "reference carrier") as a reference resource, and interprets a configuration for one or more second component carriers as indicating resource offsets.

As mentioned above, a reference configuration of reference resources may include a reference start symbol, a reference number of symbols, a reference for a start PRB, and/or a reference for a cyclic shift (CS) index. Correspondingly, the resource offset values may include offset for start symbol, offset for a number of symbols, offset for start PRB, and/or offset for CS index. For instance, the reference configurations and the reference carrier and the configurations of resource offsets for the other carriers are signaled semi-statically via RRC signaling or in system information such as system information blocks (SIB). E.g., the configurations of the resource offsets for the different carriers may be included in the RRC, and the reference resource(s) may be semi-statically configurable via SIB.

Figure 13:
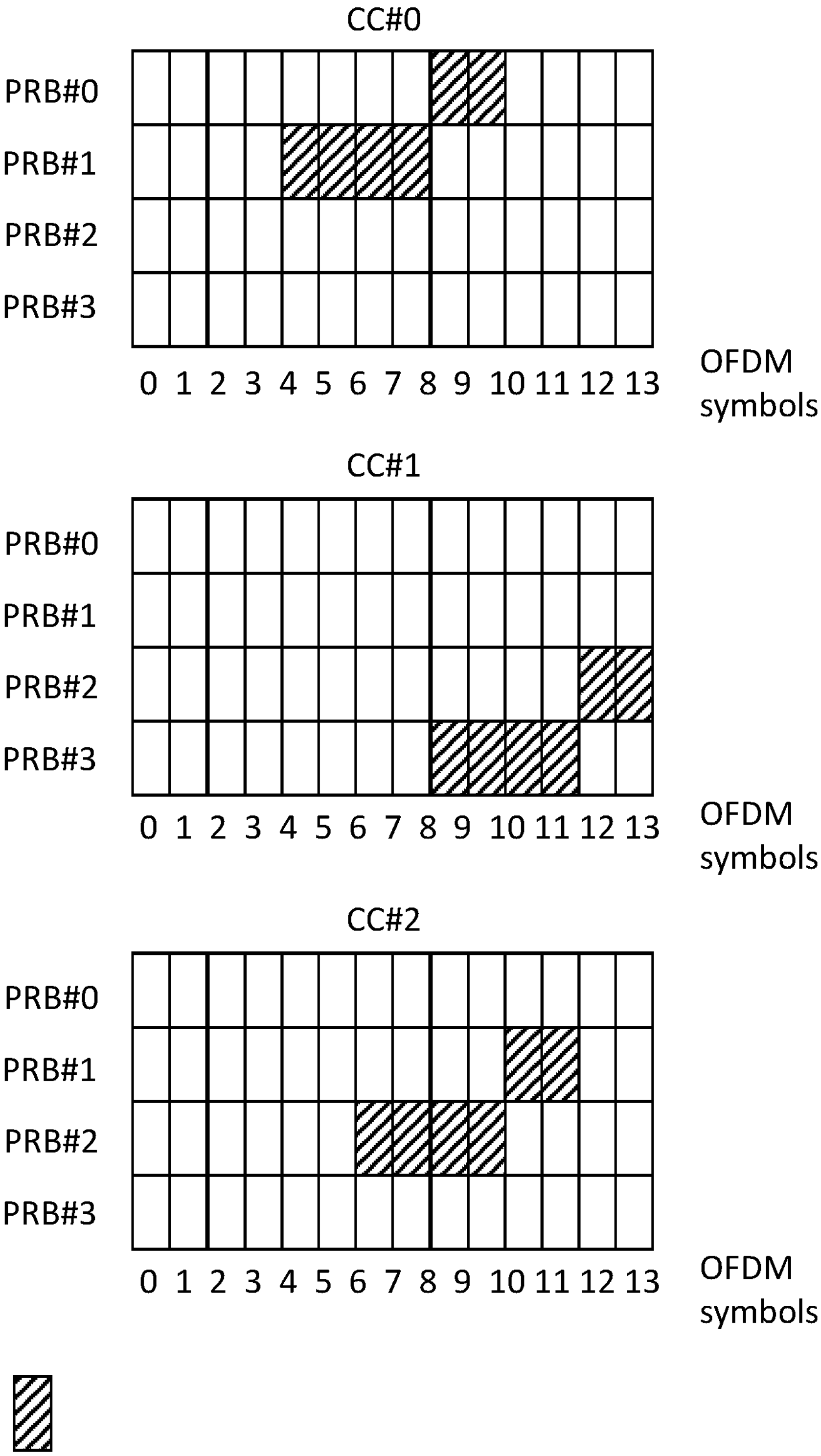
FIG. 13 illustrates PUCCH configurations for different carriers.

In an example shown in FIG. 13, three carriers are considered. Carrier CC #0 is considered as a reference for defining PUCCH configurations. There are two PUCCH configurations for reference carrier CC #0, PUCCH0 and PUCCH1. In the example shown, PUCCH0 consists of 2 symbols, starting from PRB #0, symbol no. S as first symbol, and initial cyclic shift index of 0 (cyclic shifts not shown in FIG. 13). PUCCH1 consist of 4 symbols, starting from PRB #1, first symbol is symbol no. 4, and initial cyclic shift index is 3. Based on this reference configuration, the PUCCH configurations over CC #1 are derived using: PRB offset of 2, start symbol offset of 4, and cyclic shift offset of 3. Further, the PUCCH configurations over CC #2 are derived using PRB offset of 1, start symbol offset of 2, and cyclic shift offset of 1.

Signaling a reference configuration and configuration offsets may facilitate reducing signaling overhead for defining PUCCH configurations over different carriers. For instance, a plurality of PUCCH configurations (e.g., PUCCH0 and PUCCH1 shown in FIG. 13) need to be defined only for the reference carrier, whereas for the remaining carriers, only one value per resource (starting symbol, number of symbols, cyclic shift, etc.). It is possible to define different PUCCH configurations among the carriers with reduced signaling overhead. Furthermore, modifying the reference PUCCH configurations of the reference carrier will directly affect the PUCCH configurations of all the other component carriers. Accordingly, changes in the resource configurations over different component carriers can be indicated by changing the configurations of the reference carrier. Possible use cases for such an approach include dual connectivity or reconfiguring of the PUCCH after handover.

However, any of the resources mentioned herein may also be indicated dynamically by including a reference resource such as a reference start symbol, a reference number of symbols, a reference for a start PRB, and/or a reference for a cyclic shift (CS) index in the DCI.

Semi-Static Configurations

As mentioned, semi-static carrier switching can be achieved by defining a timing pattern for the UE to select the target carrier for PUCCH transmission. For instance, a timing pattern defines slots or other indications of time instances for switching component carriers or for transmitting/receiving a given message (e.g., transmitting UCI) on a certain component carrier. For instance, a timing pattern may indicate the time instances (such as slots) for reception or transmission as well as the component carrier on which the transmission or reception is to be performed.

Moreover, in addition to or combined with the timing pattern, the base station may send offset values for the reference resources to be used in the different component carriers. For instance, the configurations of the timing pattern and of the reference offsets are carried and signaled semi-statically, e.g., by RRC signaling.

By providing offsets in connection with the timing pattern, it is possible to configure the offset for a given transmission timing (e.g., for a specific slot) rather than configuring the offset per component carrier.

For instance, the indication of reference resource includes a timing pattern. The timing pattern (or a configuration provided in addition to the timing pattern) provides, for each of a plurality of reference timings (e.g., time instances such as slots (or mini-slots) defining the reference resource), the indication of the component carrier and an indication of the resource offset. For time resources such as slots or frequency resources, the resource offset will be indicated of the numerology of the respective component carrier.

As described under "Timing indication according to reference carrier", the timing pattern may define as reference resources, slots or other time instances in terms of a reference numerology, whereas the indicated offsets are to be evaluated or interpreted in terms of a target numerology of target carriers indicated by the timing pattern.

Figure 14:
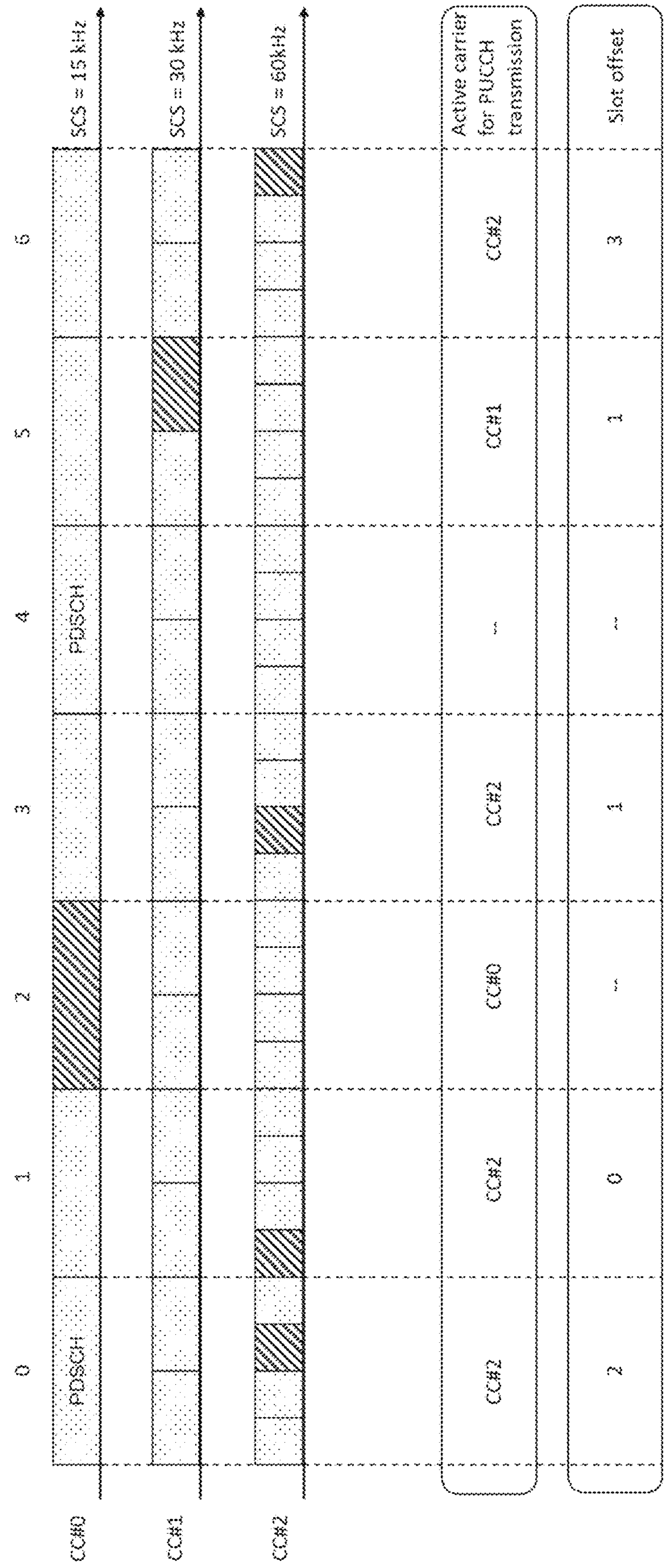
FIG. 14 illustrates timing pattern configurations along with offset values.

In the following, timing pattern configurations along with slot offset values will be described for SPS traffic with k1=2 (the UE is scheduled by SPS to transmit a UCI 2 slot lengths after a slot where a PDSCH is received, the slot length being interpreted in accordance with a reference numerology), as illustrated by FIG. 14. Shown are three component carriers CC #0 to CC #2 and seven slots (reference slots) according to the numerology (SCS=15 kHz) of CC #0 numbered 0 to 6.

The configuration can be signaled to the UE by indicating, with the timing pattern, an active carrier and a slot offset, where offset sets or offsets are defined for all slots (or mini-slots). E.g., the indication of the active carrier and the slot offset is signaled for all slots, e.g., for all consecutive slots within the time range to which the configuration is applicable. In the example of FIG. 14, the indication could be as follows:

active carrier: 2, 2, 0, 2, X, 1, 2 slot offset: 2, 0, X, 1, X, 1, 3

Therein, X can be any value, e.g., zero or NA. In case of the active carrier, no slot for UCI transmission is configured in reference slot no. 4, therefore any value can be indicated for the component carrier and the slot offset. Furthermore, in case of CC #0 in reference slot no. 2, the UE knows that the slot offset is zero (because with SCS=15 kHz, there is only one slot in the applicable slot duration), and thus, any value can be signaled as the slot offset, and the UE will determine the slot offset as zero irrespective of the signaled value. Thus 0 or any value may be signaled.

Alternatively, rather than signaling a placeholder for slots without UL transmission opportunity a configuration may be signaled with the timing pattern only for slots where UL or UCI transmission opportunities are configured (in the example of FIG. 14, all slots except slot no, 4). The offsets and offset sets are then defined only for mini-slots/slots with UL transmission opportunity among all carriers. Accordingly, the following values are signaled:

active carrier: 2, 2, 0, 2, 1, 2 slot offset: 2, 0, 0, 2, 1, 3 or 2, 0, X, 2, 1, 3

The omission of resource offsets and component carrier indications for reference slots without UL transmission may provide for reducing signaling overhead.

However, a further reduction in signaling may be provided by configuring and defining component carriers and slot/mini-slot offsets in the timing pattern only for reference slots (or mini-slots) for transmitting a HARQ-ACK report (including ACK/NACK) of SPS DL transmissions or other semi-persistently scheduled UCIs. In the example of FIG. 14 with PDSCH in slots no. 0 and 4 and k1=2, only configurations for reference slots no. 2 ad 6 need to be signaled:

active carrier: 0, 2 slot offset: 0, 3.

For the case of configuring the timing pattern only (mini-) slots configured for SPS HARQ-ACK, the timing pattern including the carrier and offset values for possible PUCCH report instances may be included in the SPS configuration, and there is no need to send the timing pattern separately from the SPS configuration.

Simultaneous Configuration of Dynamic and Semi-Static Carrier Switching

The UE might be configured with dynamic and semi-static carrier switching simultaneously. The UE needs to determine which of these should be applied for transmitting PUCCH assigned to scheduled DL transmissions. In the following, approaches will be described to instructing the UE to follow either dynamic or semi-static carrier switching.

In some embodiments of the present disclosure, the UE circuitry 880 determines, based on the indication of the component carrier, whether to select a first component carrier indicated by the indication or a second component carrier indicated by a timing pattern for semi-static carrier switching (e.g., configured by RRC signaling).

This determination of whether to use a dynamically indicated or a semi-statically indicated component carrier may be combined with the indication of a resource for the UCI transmission as described in the previous embodiments. For instance, when a dynamically indicated component carrier is selected, the UE may determine the reference resource in accordance with the embodiments described above under "Timing indication according to target carrier", and when the semi-statically configured component carrier is selected, the UE may determine the resource for the UCI as described, e.g., in the embodiments entitled "Timing indication according to target carrier" and "Semi-static configurations".

However, the disclosure also provides the determination as to whether to use a dynamically or a semi-statically configured component carrier independently (and possibly without indication) of the indication of the resource.

Figure 15:
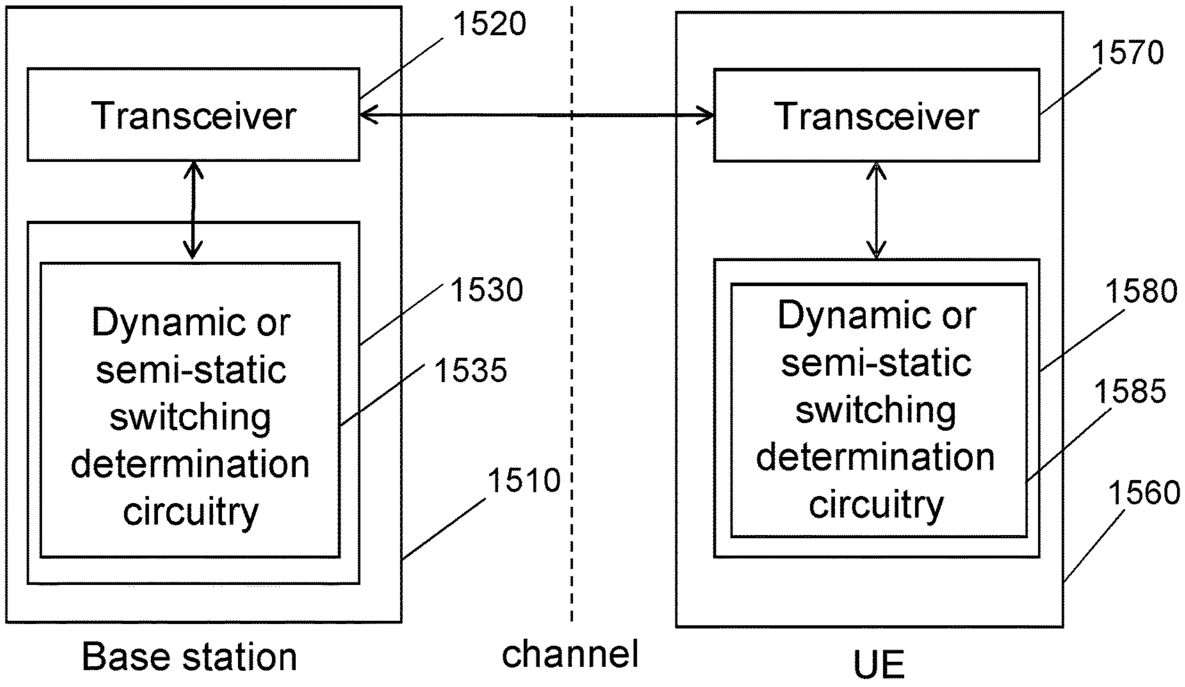
FIG. 15 is a block diagram showing a UE and a base station.

Accordingly, as shown in FIG. 15, provided is a UE 1560 comprising circuitry 1580 and a transceiver 1570. The UE transceiver 1570 receives an indication of a component carrier dynamically via DCL The UE circuitry determines, based on the indication of the component carrier, whether to select a first component carrier indicated by the indication of the component carrier or a second component carrier indicated by a timing pattern for semi-static carrier switching (in a semi-static configuration), selects, based on the result of the determination, a component carrier for transmission of a UCI, and controls the transmission of the UCI on the component carrier selected based on the result of the determination.

Also provided is a base station 1510 comprising BS circuitry 1530 and a BS transceiver 1520. The BS circuitry 1530, in operation determines, out of a component carrier configured for dynamic carrier switching and a component carrier configured for semi-static switching, a component carrier for receiving a UCI, the BS transceiver 1520 transmits a DCI indicating, if the component carrier for dynamic switching is selected as the component carrier for receiving the DCI, the component carrier for receiving the DCI, and indicating, if the component carrier for semi-static switching is selected, a value indicating that semi-static switching is to be performed or a value of a component carrier unavailable for the UCI, wherein the BS circuitry 1530, in operation, and controls reception of the UCI on the indicated component carrier.

As shown in FIG. 15, the UE circuitry 1580 may include dynamic or semi-static switching determination circuitry switching circuitry 1585, Also, base station circuitry 1530 may include dynamic or semi-static switching determination circuitry.

Furthermore, as already mentioned the UE 1560 and UE 860 as well as base station 1510 and base station 810 may respectively be provided as a single device, comprising UE circuitry 880, 1580 and base station circuitry 1530, 830.

Figure 16:
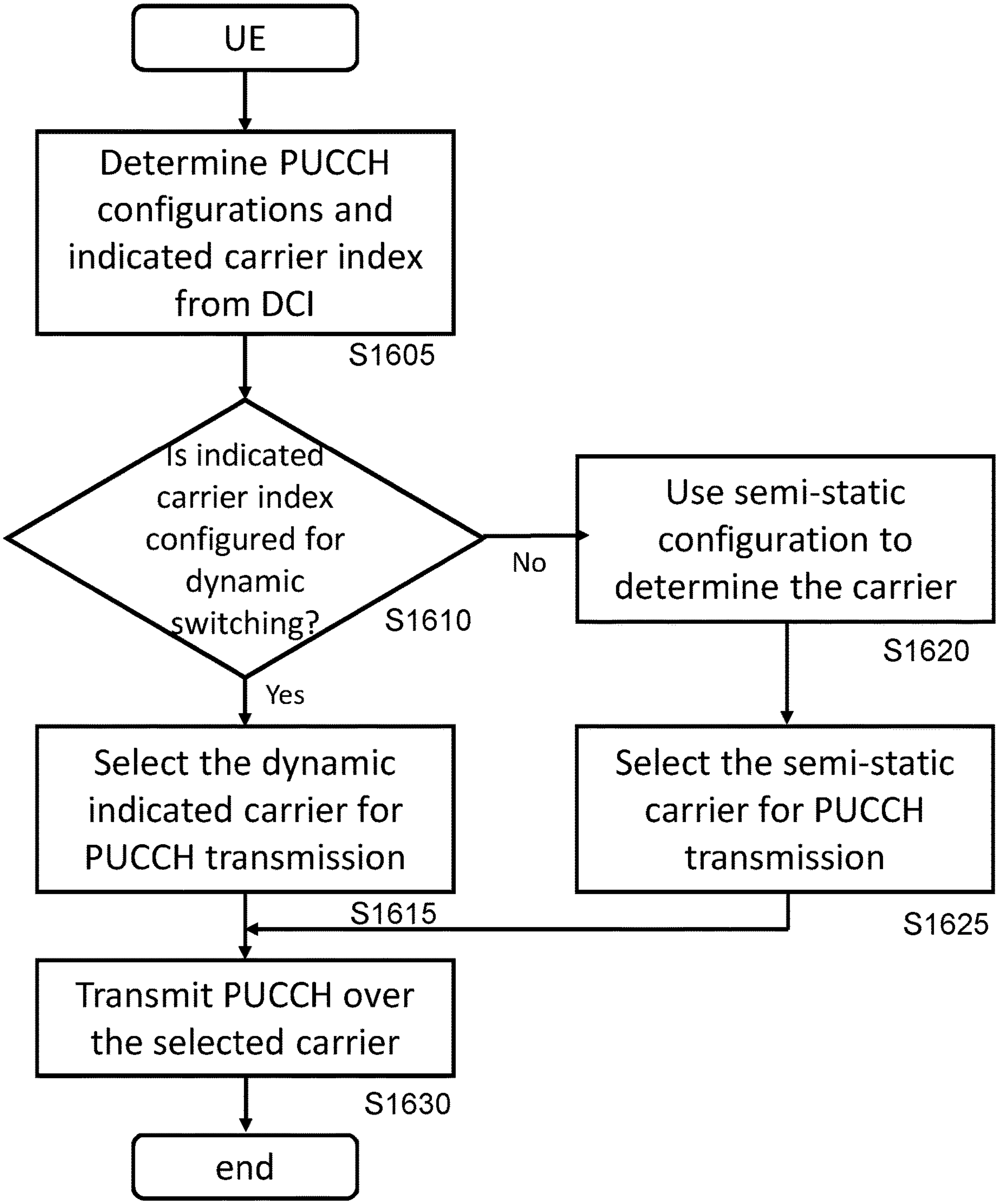
FIG. 16 is a flow chart showing steps of a UE method.
Figure 18:
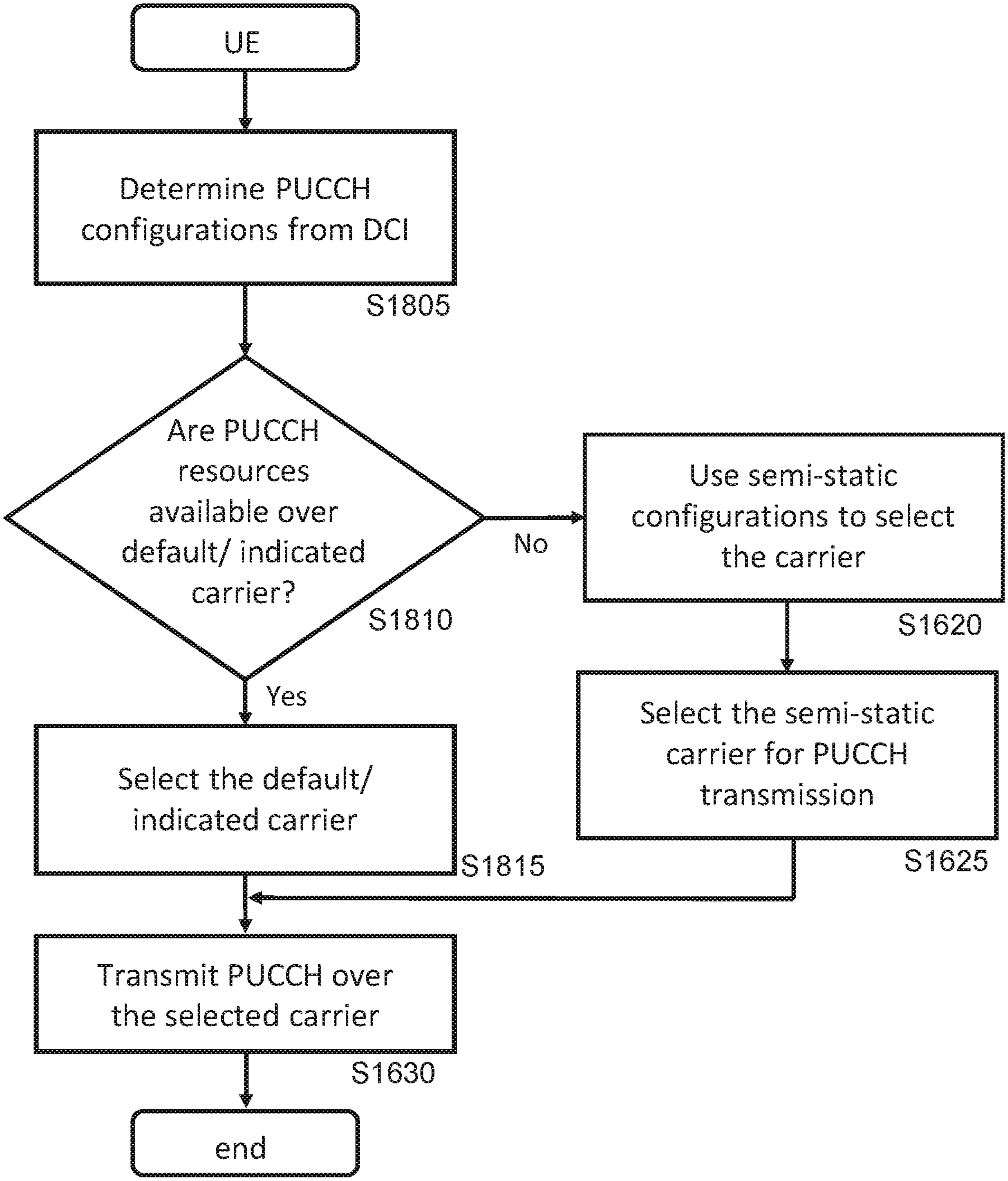
FIG. 18 is a flow chart showing steps of a UE method.

Also provided is a method for a UE illustrated in FIGS. 16 and 18, The method includes a step of receiving an indication of a component carrier dynamically via DCL The method further includes a step S1610, S1810 of determining, based on the indication of the component carrier, whether to select a first component carrier indicated by the indication of the component carrier or a second component carrier indicated by a timing pattern for semi-static carrier switching, and a step S1615, S1615 or S1625 of selecting a component carrier for transmission of an uplink control information, UCI, based on the result of the determination. The method further includes a step of controlling transmission S1630 of the UCI on the component carrier selected based on the result of the determination.

One approach for the indication as to whether to perform semi-statically or dynamically configured carrier switching is to use an explicit indication in the DCI to follow semi-static switching, e.g., a particular CI value different from the CI values indicating component carriers for dynamic switching. For instance, a carrier index (C) can be provided in DCI as a dedicated field or as a part of the PRI defining the resources for the DCI transmission.

E.g., a first value indicates the first component carrier and a second value indicates semi-static carrier switching. If the indication (the CI) indicates the first value, the UE circuitry 880, 1580 selects the first component carrier for transmitting the UCI, and if the indication indicates the second value, the UE circuitry 880, 1580 selects the second component carrier.

An example is provided in Table 1, where two-bit CI values are provided. Three values are assigned to carriers for dynamic switching, and one value is assigned to enable semi-static carrier switching.

TABLE 1

| CI value | Active CC for PUCCH transmission |
|---|---|
| 00 | CC#0 |
| 01 | CC#1 |
| 10 | CC#2 |
| 11 | Use semi-static carrier switching |

Figure 17:
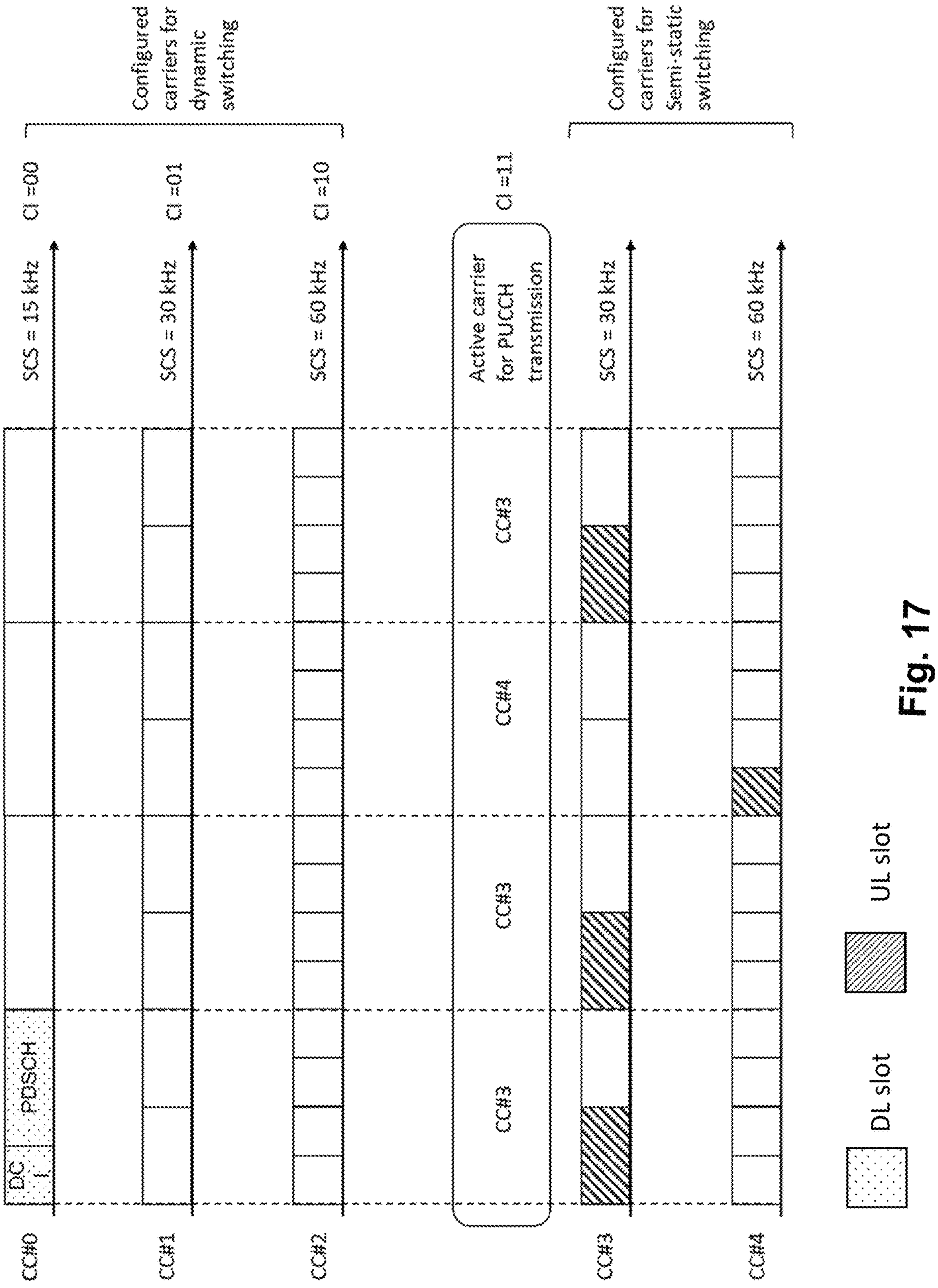
FIG. 17 illustrates simultaneous configuration of dynamic and semi-static carrier switching.

An example is shown in FIG. 17, where three different carries (CC #0 to CC #2) can be selected for PUCCH transmissions dynamically in accordance with Table 1, while two carriers (CC #3, CC #4) can be selected semi-statically.

A flowchart for UE method steps in the case of simultaneous dynamic and semi-static PUCCH carrier switching with explicit indication is shown in FIG. 16. In step S1605, the UE (e.g., UE circuitry 880, 1580) determines the indicated carrier index (and possibly also PUCCH configurations) from a received DCL Then, in step 1610, the UE circuitry 880, 1580 checks whether the indicated carrier index configured for dynamic switching. If no, the UE circuitry 880, 1580 uses a semi-static configuration to determine the carrier, step S1620, and selects the semi-static carrier configured for the PUCCH transmission (e.g., in accordance with a timing pattern configured by the semi-static configuration), step 1625. If yes, the UE circuitry 880, 1580 selects the dynamically indicated carrier indicated in the DCI for the PUCCH transmission (the transmission if the UCI via PUCCH). In step S1630, the UCI is transmitted via PUCCH over the selected carrier (e.g., the UE circuitry 880, 1580 controls transmission, and the UE transceiver 870, 1570 transmits the UCI).

The simultaneous dynamic and semi-static carrier switching enables supporting a larger number of carriers and PUCCH configurations without increasing the DCI overhead significantly. In the example of Table 1 and FIG. 17, a total of 5 carriers are supported, while the CI field contains only 2 bits.

Another approach is to use semi-static switching when the indicated PUCCH cannot be transmitted over the default (e.g., DCI format 1_0 of NR) or indicated (e.g., DCI format 1_1) component carrier. E.g., the carrier (default or indicated) is not available for UL transmission in a slot (or mini-slot or, more generally, on resources in the time domain) allocated in the DCI for the UCI transmission. In this approach, there is no need for an explicit indication enabling semi-static switching (e.g., no particular value indicating that the semi-static pattern is to be used, such as value "11" in Table 1).

In some embodiments, the first component carrier is a component carrier available for uplink transmission. If the indication of the component carrier indicates the first component carrier, the UE circuitry 880, 1580 selects the first component carrier for transmitting the UCI, and if the indication of the component carrier indicates a component carrier unavailable for uplink transmission, the UE circuitry 880, 1580 selects the second component carrier.

For instance, the indication of the component carrier is a CI value in the DCI (e.g., a one-bit or two-bit value, or more bits). Depending on whether or not the indication of the component carrier indicates a component carrier available in the slot (or other time resource) scheduled or configured for UCI transmission, the UE circuitry 880 controls the UE transceiver 870 to transmit the UCI, and the UE transceiver 870, 1570 transmits the UCI accordingly either on the indicated component carrier or on a semi-statically configured component carrier.

E.g., the UE first follows the dynamic DCI to determine the PUCCH configuration and possibly the target carrier (if indicated, e.g., by DCI format 1_1). In case the PUCCH occasion is not available over the carrier, then the UE follows the semi-static rule (e.g., semi-statically configured timing pattern) to determine the carrier for PUCCH transmissions.

Figure 19:
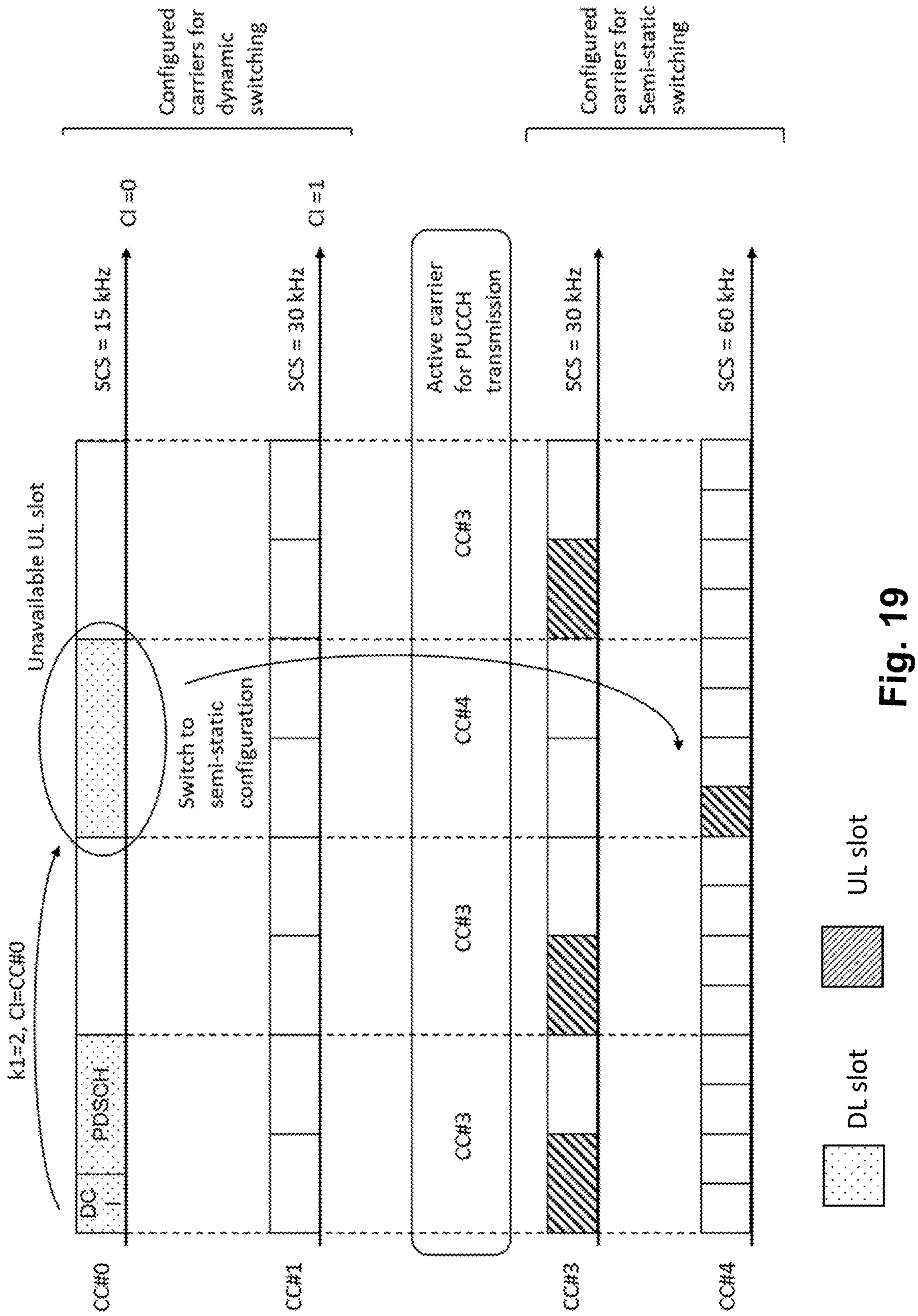
FIG. 19 illustrates simultaneous configuration of dynamic and semi-static carrier switching.

An example is shown in FIG. 19, where a 1-bit CI is utilized to indicate two carriers, and another two carriers can be selected semi-statically.

As described above, the indication of the dynamic component carrier may be included in the DCI, e.g., DCI format 1_1, possibly in addition to an indication for a resource (e.g., including a time resource) for the PUCCH. However, the alternatively, the switching to the semi-static configuration may be performed when the DCI does not include an indication of a component carrier, e.g., when the DCI is DCI format 1_0. For instance, the DCI indicates a resource such as a transmission occasion for PUCCH, and if the resource is available, the UE will transmit the UCI on the transmission occasion. If not, the UE circuitry will determine a CC on which the transmission occasion is available in accordance with the semi-static timing pattern.

A flowchart for simultaneous dynamic and semi-static PUCH without explicit indication of enabling semi-static switching is shown in FIG. 18. In step S1805, the UE circuitry 880, 1580 determines the PUCCH configurations from the DCI. If indicated, the UE may further determine the carrier index from the DCI, and step S1805 becomes similar to S1605. In step S1810, it is determined whether the PUCCH resources indicated by the configuration are available over default/indicated carrier. If yes, the default carrier or indicated carrier is selected in step S1815, Steps S1620 and S1525 following the negative determination in step S1810 as well as step S1630 correspond to the steps with the same reference numerals in FIG. 16.

Similar to the approach of explicit indication of semi static signaling, the approach without implicit indication of semi-static signaling enables supporting a larger number of carriers without increasing the DCI overhead significantly. Additionally, there is no need to assign a dedicated CI value for explicitly indicating semi-static indication.

Figure 20:
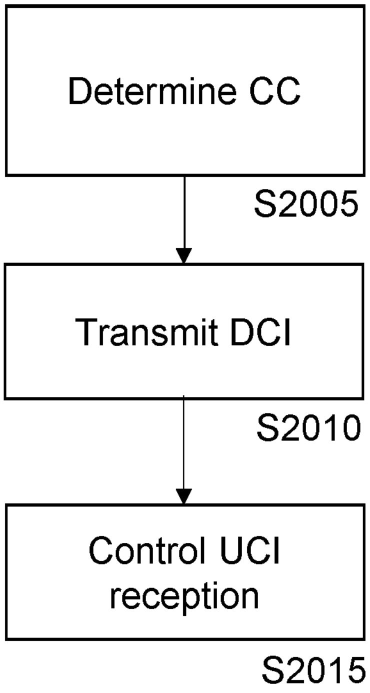
FIG. 20 is a flow chart showing steps of a base station method.

In correspondence with the base station 1510, provided is a method for a base station shown in FIG. 20. The BS method includes step S2005 of determining out of a component carrier configured for dynamic carrier switching and a component carrier configured for semi-static switching, a component carrier for receiving a UCI from a UE, step S2010 of transmitting a DCI indicating, if the component carrier for dynamic switching is selected as the component carrier for receiving the DCI, the component carrier for receiving the DCI, and indicating, if the component carrier for semi-static switching is selected, a value indicating that semi-static switching is to be performed or a value of a component carrier unavailable for the UCI, and step S2015 of controlling reception of the UCI on the indicated component carrier.

In some embodiments of the present disclosure, examples have been described where the resource offset is specified respectively for each a plurality of component carriers out of which the component carrier for transmitting the UCI is selected (e.g., the slot offsets shown in FIGS. 11 and 12). E.g., for each component carrier, a respective resource offset (e.g., slot offset) is configured.

Alternatively, the resource offset may be common to all component carriers with the same numerology, from among a plurality of component carriers out of which the component carrier for transmitting the UCI are selected (in case more than one component carriers have the same numerology). For instance, a configuration of the resource offset may be provided per numerology rather than per component carrier, which may reduce the semi-static signaling.

In a further example, a first resource offset or offset set may be defined for all carriers configured for dynamic carrier switching, and a second resource offset or offset set is specified for semi-static carrier switching. E.g., a plurality of component carriers out of which the component carrier for transmitting the ICI are selected include component carriers configured for dynamic component carrier switching and component carriers for semi-static component carrier switching, a first resource offset is specified as being common to the component carriers configured for dynamic component carrier switching, and a second resource offset is specified as being common to the component carriers configured for semi-static component carrier switching. E.g., such different offsets for carriers for dynamic and semi-static carrier switching may be configured in combination with the embodiments having a simultaneous configuration of semi-static and dynamic carrier switching, In the present disclosure, the downlink control signal (information) related to the present disclosure may be a signal (information) transmitted through PDCCH of the physical layer or may be a signal (information) transmitted through a MAC Control Element (CE) of the higher layer or the RRC. The downlink control signal may be a pre-defined signal (information).

The uplink control signal (information) related to the present disclosure may be a signal (information) transmitted through PUCCH of the physical layer or may be a signal (information) transmitted through a MAC CE of the higher layer or the RRC. Further, the uplink control signal may be a pre-defined signal (information). The uplink control signal may be replaced with uplink control information (UCI), the 1st stage sidelink control information (SCI) or the 2nd stage SCI.

In the present disclosure, the base station may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. Further, in side link communication, a terminal may be adopted instead of a base station. The base station may be a relay apparatus that relays communication between a higher node and a terminal. The base station may be a roadside unit as well.

The present disclosure may be applied to any of uplink, downlink and sidelink.

The present disclosure may be applied to, for example, uplink channels, such as PUSCH, PUCCH, and PRACH, downlink channels, such as PDSCH, PDCCH, and PBCH, and side link channels, such as Physical Sidelink Shared Channel (PSSCH), Physical Sidelink Control Channel (PSCCH), and Physical Sidelink Broadcast Channel (PSBCH).

PDCCH, PDSCH, PUSCH, and PUCCH are examples of a downlink control channel, a downlink data channel, an uplink data channel, and an uplink control channel, respectively. PSCCH and PSSCH are examples of a sidelink control channel and a sidelink data channel, respectively. PBCH and PSBCH are examples of broadcast channels, respectively, and PRACH is an example of a random access channel.

The present disclosure may be applied to any of data channels and control channels. The channels in the present disclosure may be replaced with data channels including PDSCH, PUSCH and PSSCH and/or control channels including PDCCH, PUCCH, PBCH, PSCCH, and PSBCH.

In the present disclosure, the reference signals are signals known to both a base station and a mobile station and each reference signal may be referred to as a Reference Signal (RS) or sometimes a pilot signal. The reference signal may be any of a DMRS, a Channel State Information-Reference Signal (CSI-RS), a Tracking Reference Signal (TRS), a Phase Tracking Reference Signal (PTRS), a Cell-specific Reference Signal (CRS), and a Sounding Reference Signal (SRS).

In the present disclosure, time resource units are not limited to one or a combination of slots and symbols, and may be time resource units, such as frames, superframes, subframes, slots, time slot subslots, minislots, or time resource units, such as symbols, Orthogonal Frequency Division Multiplexing (OFDM) symbols, Single Carrier-Frequency Division Multiplexing Access (SC-FDMA) symbols, or other time resource units. The number of symbols included in one slot is not limited to any number of symbols exemplified in the embodiment(s) described above, and may be other numbers of symbols.

The present disclosure may be applied to any of a licensed band and an unlicensed band.

The present disclosure may be applied to any of communication between a base station and a terminal (Uu-link communication), communication between a terminal and a terminal (Sidelink communication), and Vehicle to Everything (V2X) communication. The channels in the present disclosure may be replaced with PSCCH, PSSCH, Physical Sidelink Feedback Channel (PSFCH), PSBCH, PDCCH, PUCCH, PDSCH, PUSCH, and PBCH.

In addition, the present disclosure may be applied to any of a terrestrial network or a network other than a terrestrial network (NTN: Non-Terrestrial Network) using a satellite or a High Altitude Pseudo Satellite (HAPS). In addition, the present disclosure may be applied to a network having a large cell size, and a terrestrial network with a large delay compared with a symbol length or a slot length, such as an ultra-wideband transmission network.

An antenna port refers to a logical antenna (antenna group) formed of one or more physical antenna(s). That is, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal is allowed to transmit a reference signal. The antenna port may also be defined as the minimum unit for multiplication of a precoding vector weighting.

The present disclosure can be realized by software, hardware, or software in cooperation with hardware, Each functional block used in the description of each embodiment described above can be partly or entirely realized by an LSI (large scale integration) such as an integrated circuit (IC), and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the ISI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology, Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other “things” in a network of an “Internet of Things (IoT)”.

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Further Aspects

According to a first aspect, provided is a user equipment, UE, comprising:

a transceiver which, in operation, receives an indication of a reference resource and an indication of a component carrier; and circuitry which, in operation, selects, based on the indication of the component carrier, a component carrier for transmitting an uplink control information, UCI;

selects, based on a configuration or a UE capability, a resource offset applicable to the selected component carrier, determines a resource for transmitting the UCI by applying the resource offset to the reference resource, and controls transmission of the UCI on the selected component carrier and on the determined resource.

According to a second aspect provided in addition to the first aspect the indication of the component carrier is received via semi-static signaling, the reference resource includes a timing reference, the resource offset includes a timing offset, and in the determination of the resource for transmitting the UCI, the circuitry interprets the timing reference according to a reference numerology, and interprets the timing offset according to a numerology of the selected component carrier.

According to a third aspect provided in addition to the first aspect, the indication of the component carrier is received dynamically via downlink control information, DCI, the reference resource includes a timing reference, the resource offset includes a timing offset and the timing reference and the timing offset are indicated in a time unit applicable to a numerology of the selected component carrier.

According to a fourth aspect provided in addition to any of the first to third aspects, the resource offset is specified respectively for each of a plurality of component carriers out of which the component carrier for transmitting the UCI is selected.

According to a fifth aspect provided in addition to any of the first to third aspects, the resource offset is specified as being common to all component carriers with the same numerology, from among a plurality of component carriers out of which the component carrier for transmitting the UCI are selected.

According to a sixth aspect provided in addition to any of the first to third aspects, a plurality of component carriers out of which the component carrier for transmitting the UCI are selected include component carriers configured for dynamic component carrier switching and component carriers for semi-static component carrier switching, a first resource offset is specified as being common to the component carriers configured for dynamic component carrier switching, and a second resource offset is specified as being common to the component carriers configured for semi-static component carrier switching.

According to a seventh aspect provided in addition to the first aspect, the reference resource includes a timing reference, the resource offset includes a timing offset, the timing reference and the resource offset are indicated in a time unit applicable to a numerology of the selected component carrier, and circuitry, in operation, calculates the timing offset such that the resource for transmitting the UCI starts at least a minimum processing time after the end of reception of the downlink message, the minimum processing time being based on a UE capability.

According to an eighth aspect provided in addition to the first aspect, the indication of reference resource includes a timing pattern, indicating, for each of a plurality of reference timings, the indication of the component carrier and an indication of the resource offset.

According to a ninth aspect provided in addition to any of the first to seventh aspects, the resource for transmitting the UCI includes one or more of a starting slot, a number of slots, a starting symbol, a number of symbols, a physical resource block, or a cyclic shift index.

According to a tenth aspect provided in addition to any of the first to ninth aspects, the indication of the component carrier is received dynamically via DCI, and the circuitry, in operation, determines, based on the indication of the component carrier, whether to select a first component carrier indicated by the indication or a second component carrier indicated by a timing pattern for semi-static carrier switching, and selects the component carrier for transmission of the UCI based on the result of the determination.

According to an eleventh aspect, provided is a user equipment, UE, comprising:

a transceiver which, in operation, receives an indication of a component carrier dynamically via downlink control information, DCI; and circuitry which, in operation, determines, based on the indication of the component carrier, whether to select a first component carrier indicated by the indication of the component carrier or a second component carrier indicated by a timing pattern for semi-static carrier switching, selects a component carrier for transmission of an uplink control information, UCI, based on the result of the determination, and controls transmission of the UCI on the component carrier selected based on the result of the determination.

According to a twelfth aspect provided in addition to the tenth or eleventh aspect, a first value indicates the first component carrier and a second value indicates semi-static carrier switching, if the indication indicates the first value, the circuitry selects the first component carrier for transmitting the UCI, and if the indication indicates the second value, the circuitry selects the second component carrier.

According to a thirteenth aspect provided in addition to the tenth or eleventh aspect, the first component carrier is a component carrier available for uplink transmission, if the indication of the component carrier indicates the first component carrier, the circuitry selects the first component carrier for transmitting the UCI, and if the indication of the component carrier indicates a component carrier unavailable for uplink transmission, the circuitry, selects the second component carrier.

According to a fourteenth aspect, provided is a base station comprising:

circuitry which, in operation, allocates a resource for receiving an uplink control information, UCI, on a component carrier and a reference resource, wherein the resource for transmitting the UCI is determinable by applying a configured resource offset applicable to the component carrier to the reference resource; and a transceiver which, in operation, transmits an indication of the reference resource and an indication of the component carrier, wherein the circuitry, in operation, controls reception of the UCI on the resource for receiving the UCI on the component carrier.

According to a fifteenth aspect provided in addition to the fourteenth aspect, the indication of the component carrier is transmitted via semi-static signaling, the reference resource includes a timing reference, the resource offset includes a timing offset, and the resource for receiving the UCI is determinable by interpreting the timing reference according to a reference numerology, and interpreting the timing offset according to a numerology of the selected component carrier.

According to a sixteenth aspect provided in addition to the fourteenth aspect, the indication of the component carrier is transmitted dynamically via downlink control information, DCI, the reference resource includes a timing reference, the resource offset includes a timing offset and the timing reference and the timing offset are indicated in a time unit applicable to a numerology of the selected component carrier.

According to a seventeenth aspect provided in addition to any of the fourteenth to sixteenth aspects, the resource offset is specified respectively for each of a plurality of component carriers out of which the component carrier for receiving the UCI is selected.

According to an eighteenth aspect provided in addition to any of the fourteenth to sixteenth aspects, the resource offset is specified as being common to all component carriers with the same numerology, from among a plurality of component carriers out of which the component carrier for receiving the UCI are selected.

According to a nineteenth aspect provided in addition to any of the fourteenth to sixteenth aspects, a plurality of component carriers out of which the component carrier for receiving the UCI are selected include component carriers configured for dynamic component carrier switching and component carriers for semi-static component carrier switching, a first resource offset is specified as being common to the component carriers configured for dynamic component carrier switching, and a second resource offset is specified as being common to the component carriers configured for semi-static component carrier switching.

According to a twentieth aspect provided in addition to the fourteenth aspect, the reference resource includes a timing reference, the resource offset includes a timing offset, the timing reference and the resource offset are indicated in a time unit applicable to a numerology of the selected component carrier, and circuitry, in operation, calculates the timing offset such that the resource for receiving the UCI starts at least a minimum processing time after the end of reception of the downlink message, the minimum processing time being based on a UE capability.

According to a twenty-first aspect provided in addition to the fourteenth aspect, the indication of reference resource includes a timing pattern, indicating, for each of a plurality of reference timings, the indication of the component carrier and an indication of the resource offset.

According to a twenty-second aspect provided in addition to any of the fourteenth to twenty-second aspects, the resource for receiving the UCI includes one or more of a starting slot, a number of slots, a starting symbol, a number of symbols, a physical resource block, or a cyclic shift index.

According to a twenty-third aspect provided in addition to any one of the fourteenth to twenty-second aspects, the indication of the component carrier is transmitted dynamically via DCI and indicates whether to select a first component carrier indicated by the indication or a second component carrier indicated by a timing pattern for semi-static carrier switching.

According to a twenty-fourth aspect, provided is a base station comprising:

- circuitry which, in operation, determines, out of a component carrier configured for dynamic carrier switching and a component carrier configured for semi-static switching, a component carrier for receiving a UCI, and
- a transceiver which, in operation, transmits a DCI indicating, if the component carrier for dynamic switching is selected as the component carrier for receiving the DCI, the component carrier for receiving the DCI, and indicating, if the component carrier for semi-static switching is selected, a value indicating that semi-static switching is to be performed or a value of a component carrier unavailable for the UCI, wherein
- the circuitry, in operation, and controls reception of the UCI on the indicated component carrier.

According to a twenty-fifth aspect, provided is a method comprising the following steps to be performed by a UE:

- receiving an indication of a reference resource;
- receiving an indication of a component carrier;
- selecting, based on the indication of the component carrier, a component carrier for transmitting an uplink control information, UCI;
- selecting, based on a configuration or a UE capability, a resource offset applicable to the selected component carrier;
- determining a resource for transmitting the UCI by applying the resource offset to the reference resource; and
- controlling transmission of the UCI on the selected component carrier and on the determined resource.

Embodiments of the method according to the twenty-fifth aspect are provided in correspondence with the UE features according to the second to tenth, twelfth, and thirteenth aspects.

According to a twenty-sixth aspect, provided is a method comprising the following steps to be performed by a UE:

- receiving an indication of a component carrier dynamically via downlink control information, DCI,
- determining, based on the indication of the component carrier, whether to select a first component carrier indicated by the indication of the component carrier or a second component carrier indicated by a timing pattern for semi-static carrier switching,
- selecting a component carrier for transmission of an uplink control information, UCI, based on the result of the determination, and
- controlling transmission of the UCI on the component carrier selected based on the result of the determination.

Embodiments of the method according to the twenty-sixth aspect are provided in correspondence with the UE features according to the twelfth or thirteenth aspect.

According to a twenty-seventh aspect, provided is a method comprising the following steps to be performed by a base station:

- allocating a resource for receiving an uplink control information, UCI, on a component carrier;
- determining a reference resource, wherein the resource for transmitting the UCI is determinable by applying a configured resource offset applicable to the component carrier to the reference resource;
- transmitting an indication of the reference resource;
- transmitting an indication of the component carrier; and
- controlling reception of the UCI on the resource for receiving the UCI on the component carrier.

Embodiments of the method according to the twenty-seventh aspect are provided in correspondence with the features of the base station according to the fourteenth to twenty-third aspect.

According to a twenty-eighth aspect, provided is a method comprising the following steps to be performed by a base station:

- determining, out of a component carrier configured for dynamic carrier switching and a component carrier configured for semi-static switching, a component carrier for receiving a UCI;
- transmitting a DCI indicating, if the component carrier for dynamic switching is selected as the component carrier for receiving the DCL the component carrier for receiving the DCI, and indicating, if the component carrier for semi-static switching is selected, a value indicating that semi-static switching is to be performed or a value of a component carrier unavailable for the UCI, and
- controlling reception of the UCI on the indicated component carrier.

According to a twenty-ninth aspect, an integrated circuit (IC) is provided, which, in operation, controls a process of a user equipment, the process comprising the following steps performed by the user equipment:

- receiving an indication of a reference resource;
- receiving an indication of a component carrier;
- selecting, based on the indication of the component carrier, a component carrier for transmitting an uplink control information, UCI;
- selecting, based on a configuration or a UE capability, a resource offset applicable to the selected component carrier;
- determining a resource for transmitting the UCI by applying the resource offset to the reference resource; and
- controlling transmission of the UCI on the selected component carrier and on the determined resource.

Embodiments of the IC according to the twenty-ninth aspect are provided in correspondence with the UE features according to any of the second to tenth, twelfth, and thirteenth aspects.

According to a thirtieth aspect, an integrated circuit is provided, which, in operation, controls a process of a user equipment, the process comprising the following steps performed by the user equipment:

- receiving an indication of a component carrier dynamically via downlink control information, DCI,
- determining, based on the indication of the component carrier, whether to select a first component carrier indicated by the indication of the component carrier or a second component carrier indicated by a timing pattern for semi-static carrier switching,
- selecting a component carrier for transmission of an uplink control information, UCI, based on the result of the determination, and
- controlling transmission of the UCI on the component carrier selected based on the result of the determination.

According to a thirty-first aspect, provided is an integrated circuit which, in operation, controls a process of a base station, the process comprising the following steps performed by the base station:

- allocating a resource for receiving an uplink control information, UCI, on a component carrier;
- determining a reference resource, wherein the resource for transmitting the UCI is determinable by applying a configured resource offset applicable to the component carrier to the reference resource;
- transmitting an indication of the reference resource;
- transmitting an indication of the component carrier; and
- controlling reception of the UCI on the resource for receiving the UCI on the component carrier.

Embodiments of the IC according to the thirty-first aspect are provided in correspondence with the features of the base station according to any of the fourteenth to twenty-third aspect.

According to a thirty-second aspect, provided is an integrated circuit which, in operation, controls a process of a base station, the process comprising the following steps performed by the base station:

- determining, out of a component carrier configured for dynamic carrier switching and a component carrier configured for semi-static switching, a component carrier for receiving a UCI;
- transmitting a DCI indicating, if the component carrier for dynamic switching is selected as the component carrier for receiving the DCI, the component carrier for receiving the DCI, and indicating, if the component carrier for semi-static switching is selected, a value indicating that semi-static switching is to be performed or a value of a component carrier unavailable for the UCI, and
- controlling reception of the UCI on the indicated component carrier.

Summarizing, techniques disclosed herein feature a user equipment (UE), a base station, a method for a UE and a method for a base station. The UE comprises a transceiver which, in operation, receives an indication of a reference resource and an indication of a component carrier, and circuitry which, in operation, selects, based on the indication of the component carrier, a component carrier for transmitting an uplink control information, UCI; selects, based on a configuration or a UE capability, a resource offset applicable to the selected component carrier, determines a resource for transmitting the UCI by applying the resource offset to the reference resource, and controls transmission of the UCI on the selected component carrier and on the determined resource.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment (UE) comprising:

- a transceiver which, in operation, receives an indication of a reference resource and an indication of a component carrier, the indication of the component carrier received dynamically via downlink control information (DCI); and
- circuitry which, in operation,
- determines whether the indication of the component carrier indicates a first value or a second value, wherein the first value indicates a first component carrier and the second value indicates semi-static carrier switching;

responsive to the indication of the component carrier indicating the first value, selects the first component carrier for transmitting an uplink control information (UCI);

responsive to the indication of the component carrier indicating the second value, selects a second component carrier indicated by a timing pattern of the semi-static carrier switching for transmitting the UCI;

selects, based on a configuration or a UE capability, a resource offset applicable to the selected component carrier;

determines a resource for transmitting the UCI by applying the resource offset to the reference resource; and controls transmission of the UCI on the selected component carrier and on the determined resource.

2. The UE according to claim 1, wherein the indication of the component carrier is received via semi-static signaling, the reference resource includes a timing reference, the resource offset includes a timing offset, and in the determination of the resource for transmitting the UCI, the circuitry interprets the timing reference according to a reference numerology, and interprets the timing offset according to a numerology of the selected component carrier.

3. The UE according to claim 1, wherein the reference resource includes a timing reference, the resource offset includes a timing offset and the timing reference and the timing offset are indicated in a time unit applicable to a numerology of the selected component carrier.

4. The UE according to claim 1, wherein the resource offset is specified respectively for each of a plurality of component carriers out of which the component carrier for transmitting the UCI is selected.

5. The UE according to claim 1, wherein the resource offset is specified as being common to all component carriers with the same numerology, from among a plurality of component carriers out of which the component carrier for transmitting the UCI is selected.

6. The UE according to claim 1, wherein, a plurality of component carriers out of which the component carrier for transmitting the UCI is selected include component carriers configured for dynamic component carrier switching and component carriers for semi-static component carrier switching, a first resource offset is specified as being common to the component carriers configured for dynamic component carrier switching, and a second resource offset is specified as being common to the component carriers configured for semi-static component carrier switching.

7. The UE according to claim 1, wherein the reference resource includes a timing reference, the resource offset includes a timing offset, the timing reference and the resource offset are indicated in a time unit applicable to a numerology of the selected component carrier, and circuitry, in operation, calculates the timing offset such that the resource for transmitting the UCI starts at least a minimum processing time after the end of reception of a downlink message, the minimum processing time being based on a UE capability.

8. The UE according to claim 1, wherein the indication of reference resource includes a timing pattern indicating, for each of a plurality of reference timings, the indication of the component carrier and an indication of the resource offset.

9. The UE according to claim 8, wherein, for a reference timing without an uplink transmission opportunity, the indication of the component carrier and the indication of the resource offset are omitted in the timing pattern.

10. The UE according to claim 1, wherein the resource for transmitting the UCI includes one or more of a starting slot, a number of slots, a starting symbol, a number of symbols, a physical resource block, or a cyclic shift index.

11. The UE according to claim 1, wherein, the first component carrier is a component carrier available for uplink transmission, and if the indication of the component carrier indicates a component carrier unavailable for uplink transmission, the circuitry, selects the second component carrier.

12. The UE according to claim 1, wherein, when the downlink control information (DCI) does not include an indication of the component carrier, the circuitry selects the component carrier according to a semi-static configuration.

13. A base station, comprising:

circuitry which, in operation, allocates a resource for receiving an uplink control information (UCI) on a component carrier and a reference resource, wherein the resource for transmitting the UCI is determinable by applying a configured resource offset applicable to the component carrier to the reference resource; and a transceiver which, in operation, transmits an indication of the reference resource and an indication of the component carrier, the indication of the component carrier transmitted dynamically via downlink control information (DCI), wherein when the indication of the component carrier indicates a first value, a first component carrier is selected for transmitting the UCI and, when the indication of the component carrier indicates a second value, a second component carrier indicated by a timing pattern of semi-static carrier switching is selected for transmitting the UCI;

the circuitry, in operation, controls reception of the UCI on the resource for receiving the UCI on the selected component carrier.

14. A communication method for a user equipment (UE), comprising:

receiving an indication of a reference resource;

receiving an indication of a component carrier dynamically via downlink control information (DCI);

determining whether the indication of the component carrier indicates a first value or a second value, wherein the first value indicates a first component carrier and the second value indicates semi-static carrier switching;

when the indication of the component carrier indicates the first value, selecting the first component carrier for transmitting an uplink control information (UCI);

when the indication of the component carrier indicates the second value, selecting a second component carrier indicated by a timing pattern of the semi-static switching for transmitting the UCI;

selecting, based on a configuration or a UE capability, a resource offset applicable to the selected component carrier;

determining a resource for transmitting the UCI by applying the resource offset to the reference resource; and controlling transmission of the UCI on the selected component carrier and on the determined resource.

* * * * *